United States Patent
Hanson et al.

(10) Patent No.: US 11,823,279 B2
(45) Date of Patent: *Nov. 21, 2023

(54) COMMUNICATION OF INSURANCE CLAIM DATA

(71) Applicant: Allstate Insurance Company, Northbrook, IL (US)

(72) Inventors: Randall Martin Hanson, Grayslake, IL (US); Raj Albert Upadhyaya, Hoffman Estates, IL (US); Srinivas Reddy Gangaram, Buffalo Grove, IL (US); Erika Ann Wales, Waukegan, IL (US)

(73) Assignee: Allstate Insurance Company, Northbrook, IL (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/516,373

(22) Filed: Nov. 1, 2021

(65) Prior Publication Data
US 2022/0058750 A1 Feb. 24, 2022

Related U.S. Application Data

(63) Continuation of application No. 16/567,848, filed on Sep. 11, 2019, now Pat. No. 11,164,261, which is a (Continued)

(51) Int. Cl.
G06Q 40/08 (2012.01)
G06Q 10/10 (2023.01)
G06Q 30/0283 (2023.01)

(52) U.S. Cl.
CPC ............. *G06Q 40/08* (2013.01); *G06Q 10/10* (2013.01); *G06Q 30/0283* (2013.01)

(58) Field of Classification Search
CPC ............................. G06Q 40/08; G06F 19/328
See application file for complete search history.

(56) References Cited

U.S. PATENT DOCUMENTS

| 5,128,859 A | 7/1992 | Carbone et al. |
| 5,950,169 A | 9/1999 | Borghesi et al. |

(Continued)

FOREIGN PATENT DOCUMENTS

| AU | 2004244648 A1 | 7/2006 |
| JP | 07239885 A * | 9/1995 |

(Continued)

OTHER PUBLICATIONS

Haggerty, Alfred G. "New system 'works the way estimators think,' (automated automobile insurance claim estimation computer system PenPro)." National Underwriter Property & Casualty-Risk & Benefits Management. n30: p. 5(2). Summit Business Media. (Jul. 25, 1994) (Year: 1994).*

(Continued)

*Primary Examiner* — Linh Giang Le
(74) *Attorney, Agent, or Firm* — Foley & Lardner LLP

(57) ABSTRACT

Systems and methods provide for an automated system for determining whether claims related to an insured item should proceed to an arbitrating body. A virtual assistant (also referred to herein as an "arbitration assessment assistant") installed in a computing device (e.g., computer, laptop, tablet computer, mobile phone, etc.) may be responsible for managing and assisting an insurance representative (e.g., an insurance adjuster, subrogation representative, etc.) in determining liability and fault relating to a claim, conducting a subrogation process, and ultimately determining whether the claim should be submitted for arbitration. In one or more aspects discussed, herein the process may be fully automated.

20 Claims, 19 Drawing Sheets

Related U.S. Application Data continuation of application No. 14/286,361, filed on May 23, 2014, now Pat. No. 10,445,835, which is a continuation of application No. 13/728,680, filed on Dec. 27, 2012, now Pat. No. 8,788,300, which is a continuation of application No. 13/651,885, filed on Oct. 15, 2012, now Pat. No. 8,725,542, which is a continuation of application No. 12/250,325, filed on Oct. 13, 2008, now Pat. No. 8,311,856.

(56) References Cited

U.S. PATENT DOCUMENTS

| | | | |
|---|---|---|---|
| 6,163,770 | A | 12/2000 | Gamble et al. |
| 7,668,738 | B2 | 2/2010 | Wiggins |
| 8,131,417 | B2 | 3/2012 | Picard |
| 8,423,388 | B1 | 4/2013 | Galusha et al. |
| 8,756,085 | B1 | 6/2014 | Plummer et al. |
| 9,002,719 | B2 | 4/2015 | Tofte |
| 9,082,015 | B2 | 7/2015 | Christopulos et al. |
| 9,131,224 | B1 | 9/2015 | Freeman et al. |
| 9,162,762 | B1 | 10/2015 | Tofte et al. |
| 9,466,085 | B2 | 10/2016 | Mullen et al. |
| 9,508,200 | B1 | 11/2016 | Mullen et al. |
| 9,558,419 | B1 | 1/2017 | Wilbert et al. |
| 9,563,814 | B1 | 2/2017 | Wilbert et al. |
| 9,589,201 | B1 | 3/2017 | Wilbert et al. |
| 9,589,202 | B1 | 3/2017 | Wilbert et al. |
| 9,594,971 | B1 | 3/2017 | Wilbert et al. |
| 9,600,733 | B1 | 3/2017 | Wilbert et al. |
| 9,607,236 | B1 | 3/2017 | Wilbert et al. |
| 9,633,146 | B2 | 4/2017 | Plummer et al. |
| 9,659,283 | B1 | 5/2017 | Tofte |
| 9,682,777 | B2 | 6/2017 | Tofte et al. |
| 9,754,171 | B1 | 9/2017 | Wilbert et al. |
| 9,760,776 | B1 | 9/2017 | Wilbert et al. |
| 9,773,184 | B1 | 9/2017 | Wilbert et al. |
| 9,779,318 | B1 | 10/2017 | Wilbert et al. |
| 9,818,154 | B1 | 11/2017 | Wilbert et al. |
| 9,824,397 | B1 | 11/2017 | Patel et al. |
| 9,858,622 | B1 | 1/2018 | Mullen et al. |
| 9,892,337 | B1 | 2/2018 | Wilbert et al. |
| 9,898,558 | B1 | 2/2018 | Tofte |
| 9,916,698 | B1 | 3/2018 | Snyder et al. |
| 2002/0007289 | A1 | 1/2002 | Malin et al. |
| 2002/0035488 | A1* | 3/2002 | Aquila .............. G06Q 40/02 705/4 |
| 2002/0065687 | A1 | 5/2002 | Onoue |
| 2002/0120473 | A1 | 8/2002 | Wiggins |
| 2002/0188479 | A1 | 12/2002 | Renwick et al. |
| 2003/0154111 | A1 | 8/2003 | Dutra et al. |
| 2005/0049912 | A1 | 3/2005 | Troyer et al. |
| 2005/0246206 | A1* | 11/2005 | Obora .............. G06Q 10/10 705/4 |
| 2007/0088580 | A1 | 4/2007 | Richards, Jr. |
| 2007/0136106 | A1 | 6/2007 | Hart et al. |
| 2007/0250415 | A1 | 10/2007 | Wilch |
| 2008/0046261 | A1 | 2/2008 | Cunningham |
| 2008/0162199 | A1* | 7/2008 | Smith .............. G06Q 10/02 705/5 |
| 2008/0243556 | A1 | 10/2008 | Hogan et al. |
| 2008/0255886 | A1 | 10/2008 | Unkefer et al. |
| 2009/0018859 | A1 | 1/2009 | Purifoy et al. |
| 2009/0048944 | A1 | 2/2009 | Eagle |
| 2009/0062978 | A1 | 3/2009 | Picard |
| 2009/0300065 | A1 | 12/2009 | Birchall |
| 2010/0030582 | A1 | 2/2010 | Rippel et al. |
| 2010/0057498 | A1 | 3/2010 | Stephen et al. |
| 2014/0358593 | A1 | 12/2014 | Vahidi et al. |
| 2015/0066781 | A1 | 3/2015 | Johnson et al. |
| 2016/0071334 | A1 | 3/2016 | Johnson et al. |

FOREIGN PATENT DOCUMENTS

| | | |
|---|---|---|
| JP | H07-239885 A | 9/1995 |
| JP | 2000-113060 A | 4/2000 |
| JP | 2003-058653 A | 2/2003 |
| JP | 2003-242276 A | 8/2003 |

OTHER PUBLICATIONS

Cerne, "Staking a Claim to the Internet," Insurance Networking, pp. 42-48 (2002) (USPTO copy provided).

Notice of Allowance on U.S. Appl. No. 16/567,848 dated Jun. 24, 2021, 10 pages.

Notice of Allowance on U.S. Appl. No. 16/867,172 dated Oct. 13, 2021, 23 pages.

Office Action on U.S. Appl. No. 16/867,172 dated Jun. 15, 2021, 14 pages.

Office Action on U.S. Appl. No. 17/683,067 dated Nov. 4, 2022, 15 pages.

Final Office Action on U.S. Appl. No. 17/683,067 dated Mar. 13, 2023, 15 pages.

* cited by examiner

FIG. 5B

COMMUNICATION OF INSURANCE CLAIM DATA

CROSS-REFERENCE TO RELATED APPLICATIONS

This application is a continuation of U.S. patent application Ser. No. 16/567,848, filed Sep. 11, 2019, which is a continuation of U.S. patent application Ser. No. 14/286,361, filed May 23, 2014, now U.S. Pat. No. 10,445,835, which is a continuation of U.S. patent application Ser. No. 13/728,680, filed Dec. 27, 2012, now U.S. Pat. No. 8,788,300, which is a continuation of U.S. patent application Ser. No. 13/651,885, filed Oct. 15, 2012, now U.S. Pat. No. 8,725,542, which is a continuation of U.S. patent application Ser. No. 12/250,325, filed Oct. 13, 2008, now U.S. Pat. No. 8,311,856. The contents of these applications are incorporated herein in their entirety by reference.

TECHNICAL FIELD

The invention relates generally to insurance. More specifically, the invention provides methods and systems for providing a vehicle insurance claim management application (VICMA) that will improve communication and streamline tasks between a vehicle repair shop and an insurance company in three general task groups: assignment management (comprising work request, estimates/photos, and reinspections), financial management, and performance measurement. The invention also provides interoperability with different types of repair estimating systems. The invention is preferably accessed by a user over a computer network such as the Internet.

BACKGROUND

Vehicle repair shops and insurance companies can gain efficiencies and improve quality of service by interoperating electronically to exchange data and documents such as repair requests, estimates, photos, authorizations, invoices, and payments. Some claim-handling systems used by insurance companies can support such interoperability with repair shop systems, known as estimating systems.

An insurer claim-handling system is typically designed to work with a specific brand of estimating system, thus requiring vehicle repair shops to use that brand to interoperate with the insurance company. Different insurance companies may specify or require the use of different estimating systems, which means that vehicle repair shops wanting to interoperate with or perform repairs for two or more insurance companies may have to purchase and maintain two or more estimating systems. The costs of purchasing, using, training, maintaining, and supporting multiple systems are inefficient for any vehicle repair shop and can be prohibitive to smaller vehicle repair shops that would otherwise want to work with multiple insurance companies.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to methods and systems for providing a vehicle insurance claim management application (VICMA) that will improve communication and streamline collaboration between the vehicle repair shop and an insurance company in three general task groups: assignment management (comprising work requests, estimates/photos, and reinspections), financial management, and performance measurement. The invention also provides interoperability with different types of estimating systems.

A first aspect of the invention provides one or more computer storage media storing computer readable instructions that, when executed, provide a vehicle insurance claim management application (VICMA). The VICMA includes an adapter module which translates data between the VICMA and a vehicle repair estimating system. The VICMA further includes an assignment module that is used by the vehicle repair shop to perform functions such as: receive assignment data from the insurance company pertaining to a work request submitted to the vehicle repair shop; transfer or pre-load assignment data to a repair estimating system; receive estimate data from the repair estimating system; review estimate data for compliance with front-end business rules; upload estimate data to an insurance company system to be reviewed for compliance with back-end rules; receive and review reinspection data from the insurance company; and update estimate data based on reinspection data.

A second aspect of the invention further includes the above described aspect of the VICMA with a financial module that stores and provides payment (Electronic Fund Transfer "EFT") status information for the vehicle repair claims assigned to the vehicle repair shop.

Another aspect of the invention further includes the above described aspect of the VICMA with a performance module that stores and provides performance metrics for the vehicle repair shop as compared to other vehicle repair facilities working with the insurance company.

Another aspect of the invention is a method for a vehicle insurance claim management application (VICMA). The method comprises a number of steps. First, the VICMA receives a set of assignment data from an insurance company pertaining to a plurality of work requests submitted to the vehicle repair shop. Next, the VICMA transfers the assignment data to a vehicle repair estimating system. Next, the VICMA receives a set of estimate data from the vehicle repair estimating system. The VICMA then translates the assignment data and estimate data between the vehicle insurance claim management application and the vehicle repair estimating system. The VICMA then reviews the estimate data for compliance with a set of front-end business rules. Next, the VICMA transfers the estimate data to an insurance company system to be reviewed for compliance with a set of back-end rules. The VICMA then receives a set of reinspection data and reviews the inspection data from the insurance company. Next, the VICMA updates the estimate data based on the reinspection data. The VICMA also tracks a real-time financial status for the repair. The tracking of the real-time status includes storing the payment status information for the plurality of work requests assigned to the vehicle repair shop, providing payment status information for the plurality of work requests assigned to the vehicle repair shop, generating invoices from the vehicle repair shop to the insurance company to initiate payment, and processing an electronic fund transfer automatically when the plurality of vehicle repairs are completed and the vehicle is delivered. The VICMA also compiles a set of vehicle repair shop performance data automatically when the plurality of work requests are completed by the vehicle repair shop.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Aspects of the invention provide a method and system for efficiently communicating data between an insurer and its repair shops, e.g., vehicle repair shops. An insurer may thus provide claim data to the vehicle repair shop, and the vehicle repair shop may provide repair cost information to the insurer. The methods and systems described herein are particularly useful for insurers utilizing direct repair partners for servicing vehicles involved in insurance claims. Direct repair refers to a process whereby an insured takes his or her vehicle directly to a repair shop (referred to herein as a direct repair partner) without having to first visit an insurance adjustor to assess damage to the vehicle. Direct repair partner shops are typically preapproved by the insurer to perform the estimating work directly on premises, thereby reducing the insurer's expense of hiring insurance adjustors and maintaining physical premises in which adjustors perform their jobs, and saving the insured's time by not requiring the insured to visit an insurance adjustor prior to visiting a repair shop or, alternatively, by not having to visit numerous vehicle repair facilities to secure multiple estimates for submission to the insurer. The communicated data may include repair estimates, photos, data regarding the insured party and/or vehicle, other data that may be used by a vehicle repair shop, data obtained by a vehicle repair shop that is subsequently provided to the insurer, financial data associated with the vehicle repair shop and its repairs, performance data for the vehicle repair shop, or reinspection reports from the insurance company. The term "photos" may refer to photos in a variety of formats, including print or digital.

Figure 1:
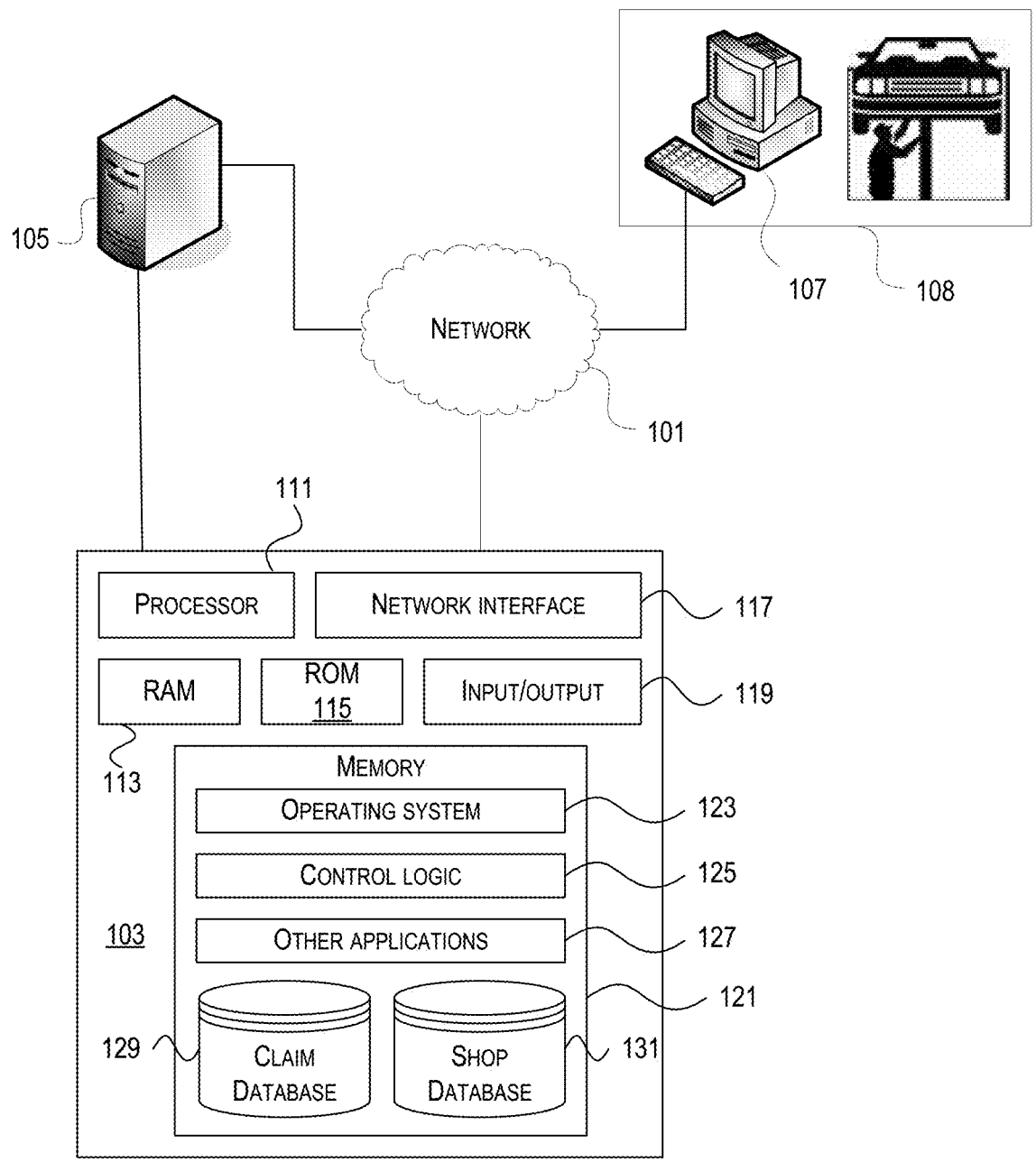
FIG. 1 illustrates a system architecture for implementing one or more illustrative aspects of the invention.

FIG. 1 illustrates one example of a network architecture and data processing device that may be used to implement one or more illustrative aspects of the invention. Various components 103, 105, 107, and 108 may be interconnected via a network 101, such as the Internet. Other networks may also or alternatively be used, including private intranets, local LANs, wireless WANs, personal PANs, storage area networks (SANs), and the like. The components may include an insurance company data server 103, web server 105, and a client computer 107. The insurance company data server 103 provides overall control and administration of data communication services according to aspects described herein. The insurance company data server 103 may be connected to the web server 105 through which users interact with the communicative system and software. The web server 105 may be for example a claim processing system which may be used to store assignment information for further processing and then translate this information into a format acceptable for the client computer 107. Alternatively, the insurance company data server 103 may act as a web server itself and be directly connected to the Internet. The insurance company data server 103 may be connected to web server 105 through the network 101 (e.g., the Internet), or via some other network.

Users may interact with the data server 103 using a remote computer 107 located on premises of a vehicle repair shop 108. The remote/client computer 107 may be any conventional data processing device that can access the Internet, e.g., laptop computers, desktop computers, ultra-mobile PCs, Internet enabled mobile devices, etc. Client computers may also be located in any other location, and need not be limited to the premises of a repair shop. Client computers may interact with data server 103 and/or web server 105, e.g., using a web browser to connect to the data server 103 via one or more externally exposed web sites hosted by web server 105. Alternatively, each client computer 107 may have a "thin client" installed thereon, whereby the thin client provides an executable shell hosting a browser-window therein. The thin client thereby limits the toolbar menus (e.g., File, Edit, View, Favorites, Tools, Help, etc.), such as are typically found in browser applications such as Microsoft's Internet Explorer, that are available to a user while accessing the data server. The thin client also adds new toolbar menus to provide services in conjunction with the data server 103 and/or web server 105, as is further described below.

Servers and applications may be combined on the same physical machines, and retain separate virtual or logical addresses, or may reside on separate physical machines. FIG. 1 illustrates but one example of a network architecture that may be used, and those of skill in the art will appreciate that the specific network architecture and data processing device used may vary, and are secondary to the functionality that they provide, as further described below.

Each component 103, 105, 107 may be any type of known computer, server, or data processing device. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. Memory 121 may further store operating system software 123 for controlling overall operation of the data server 103, control logic 125 for instructing data server 103 to perform aspects of the invention as described herein, and other application software 127 providing secondary support or other functionality which may or might not be used in conjunction with aspects of the present invention. The control logic 125 may be referred to herein as the data server software or repair shop communication (RSC) software. Functionality of the data server software may refer to operations or decisions made automatically based on rules coded into the control logic, or made manually by a user providing input into the system.

Memory 121 may also store data used in performance of one or more aspects of the invention, including a claim database 129 and a shop database 131. The claim database 129 may store information regarding claims submitted by the insurer's insureds. Claim information may include, e.g., a date of accident, type of vehicle, insured's name, etc. The shop database 131 stores information about the various vehicle repair shops 108 with which the insurer works to repair customers' vehicles. The shop database 131 may store, for each vehicle repair shop 108, shop contact information, available services (e.g., body shop, engine, transmission, audio/video, etc.), hours of operation, as well as indicate whether each shop is a direct repair partner or whether review by an insurance adjustor is required. In some embodiments, the claim database 129 and shop database 131 may be stored in a single database system. That is, the information can be stored in a single database, or separated into different logical, virtual, and/or physical databases, depending on system design.

Those of skill in the art will appreciate that the functionality of the data server 103 as described herein may be spread across multiple data servers or data processing devices, for example, to distribute processing load across multiple computers, to segregate transactions based on geographic location, insurer, insured, type of insurance, etc. In addition, one or more aspects of the invention may be embodied in computer-usable data and computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Vehicle Insurance Claim Management Application (VICMA)

Generally, the vehicle insurance claim management application (VICMA) improves communication and streamlines tasks between a vehicle repair shop and an insurance company in three general task groups: assignment management (comprising work requests, estimates/photos, and reinspections), financial management (e.g., electronic funds transfers (EFT)), and performance measurement. A work request also may be referred to as work assignment, repair request, service request, record transfer, vehicle claim or other terms. Whatever term is used, it is not meant to imply any particular type of relationship or obligation between the insurance company and a vendor.

Figure 2A:
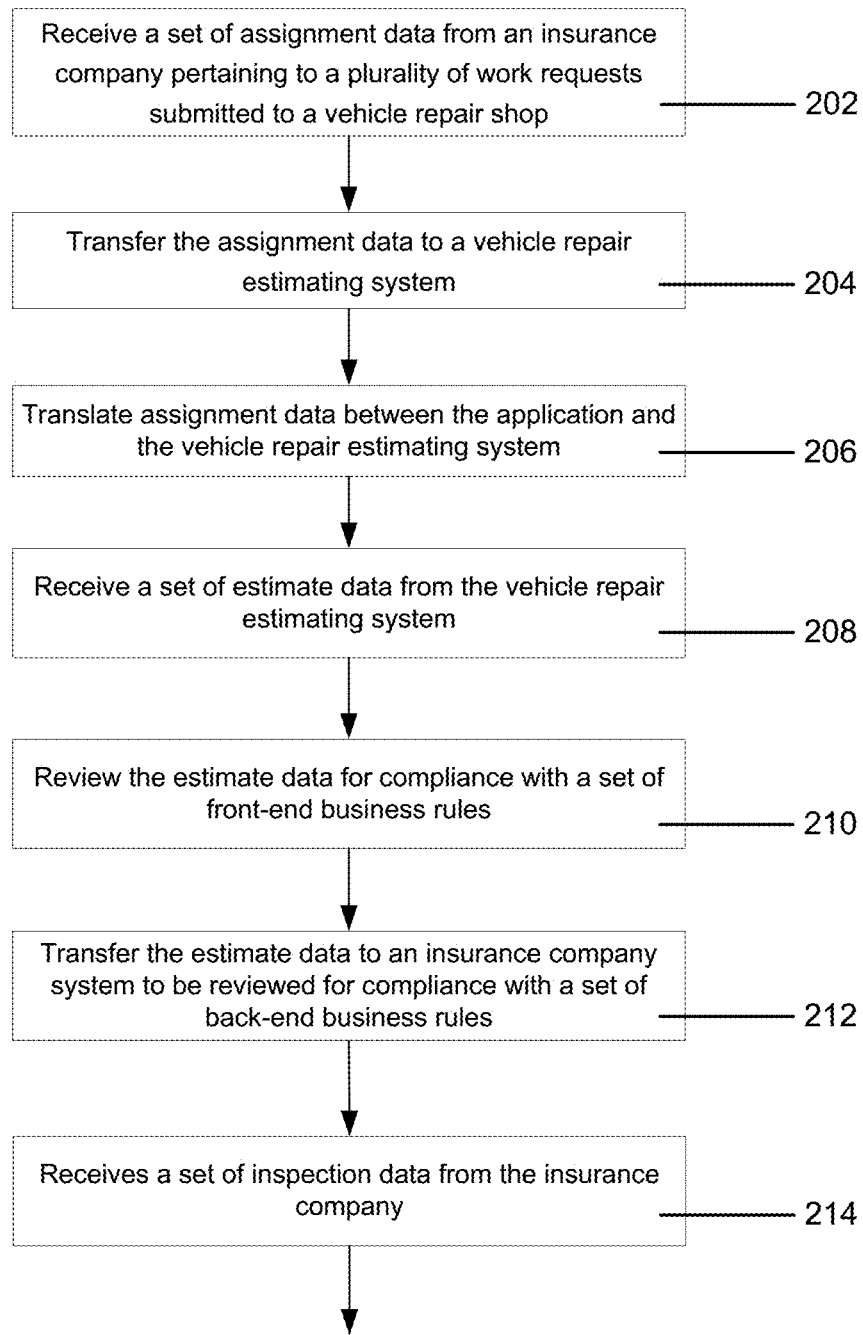
FIGS. 2A and 2B illustrate a flowchart of the methodology for implementing one or more illustrative aspects of the invention.
Figure 2B:
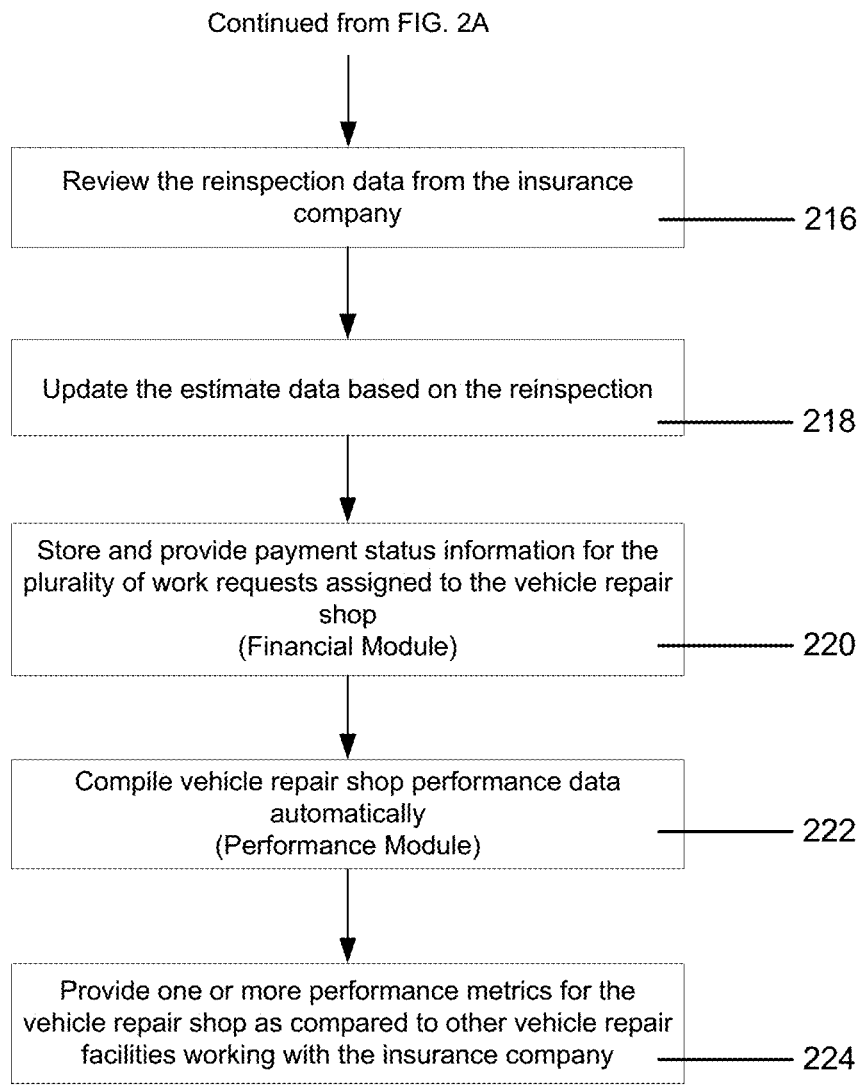

FIGS. 2A and 2B illustrate a method for the VICMA for use by an insurance company and a user of a computer system at a vehicle repair shop. The method of FIGS. 2A and 2B will be described further in the following exemplary embodiment.

Figure 3:
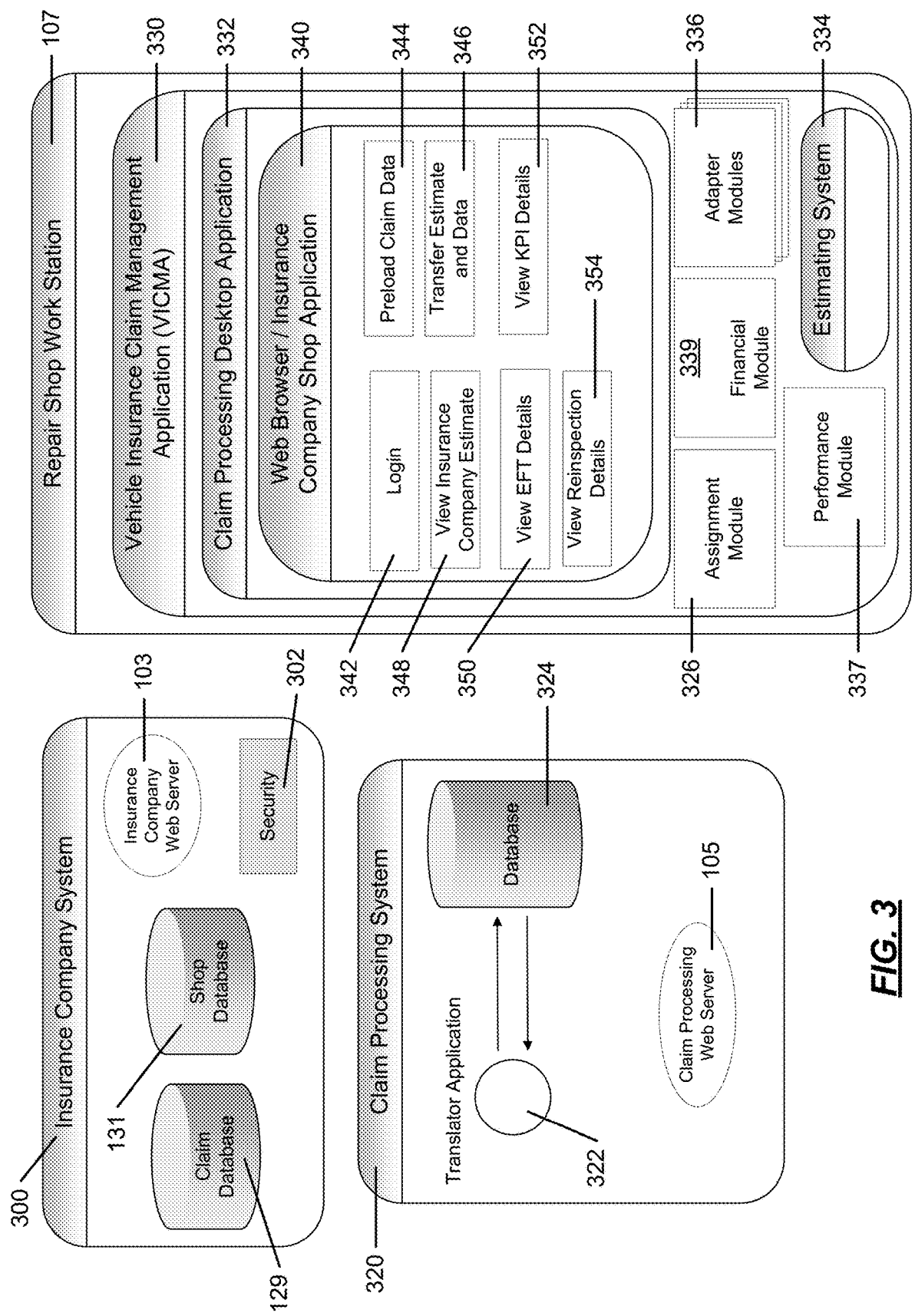
FIG. 3 is an illustrative system overview for one or more aspects of the invention.

FIG. 3 illustrates the insurance company system 300, a claim processing system 320, and the repair shop work station 107 from FIG. 1. The insurance company system 300 may include the claim database 129 and shop database 131 as well as a security system 302. In addition, the claim processing system 320 may include a claim processing web server 105, a translator application 322, and an additional database 324. The repair work station 107 may include the VICMA 330 as described further in this description. Within the repair shop work station 107, there may also be a claim processing desktop application 332 and a web-browser/insurance company shop application 340. While the shop application 340 is illustrated conceptually as residing at the repair shop workstation 107, the shop application 340 may alternatively be accessed by and interact with the claim processing desktop application 332 using a web browser or browser shell/window. That is, the shop application 340 may be housed or served by web server 105 associated with claim processing system 320, and merely accessed using a thin client claim processing desktop application 332. Within the web-browser/insurance company shop application 340 the user may perform a number of different actions such as: authentication or login 342, pre-load assignment data 344, transfer estimates and data 346, view insurance company estimates 348, view EFT details 350, view Key Performance Indicators (KPI) 352, or view reinspection details 354. Furthermore, there may be a repair estimating system 334 within the claim processing desktop application 332. The following sections will further describe the interaction between each of these systems and applications.

The VICMA 330 may comprise a number of modules which may include, but is not limited to, the following: an adapter module 336, an assignment module 326, a financial module 339, and a performance module 337. Each of these modules will be described in more detail in the below sections.

Assignment Module

The insurance company may offer assignments to the vehicle repair shop for either repairs or estimates as part of the first notice of loss (FNOL) process. After the vehicle repair shop has been offered the assignment and submitted the estimate, the vehicle repair shop typically completes the corresponding repairs upon approval by the insurance company and absent any special circumstances. The present invention may provide the vehicle repair shop with assignment data needed to prepare a repair estimate or repair the vehicle. Assignment data may include, but not be limited to, customer name, contact information, insurance claim number, assignment date, loss date, loss type, loss type detail, loss description, current vehicle location, location where vehicle may be sent, deductible amount, vehicle type, year/make/model, vehicle identification number (VIN), license plate number, towing company information, damage information, prior damage information, and vehicle safety status (drivable/non-drivable). One of the elements of the VICMA and the "direct connection" with the vehicle repair shop is the ability to provide assignment information and to offer real-time updates when any of the information changes during the course of the claim and/or repair. For example, an assignment might not have contained a deductible amount or a correct deductible amount at the initiation of the assignment. Through further investigation, the amount of the error could be discovered or corrected and the assignment information could be immediately updated to the vehicle repair shop that needs that data to conclude the repair and the associated financial processing. In other words, the VICMA and "direct connection" with the vehicle repair shop may expedite the repair for the customer.

An assignment module 326 may be defined by computer readable instructions from the VICMA 330. The assignment module 326 may comprise three functions: work requests, estimates/photos, and reinspections. In one embodiment of the present invention, in a first step 202, the insurance company system 300, as part of the assignment module 326, transfers (the term "transfer," as used throughout, refers to uploading and/or downloading and/or pre-loading, depending on the specific situation, between two or more software applications residing on one or different computers or computer systems) a set of assignment data pertaining to a plurality of work requests. The work requests are received by the vehicle repair shop through the VICMA and the assignment module 326. A work request may be referred to by other terms such as work assignment, repair request, service request, record transfer, vehicle claim or other terms. Whatever term is used, it is not meant to imply any particular type of relationship or obligation between the insurance company and a vendor. The assignment data may be stored in a claim processing system database 324. The specific claim information is assigned to a given vehicle repair shop 108 and may be transferred to the vehicle repair shop 108 after the vehicle repair shop identity is authenticated by the VICMA 330.

Authentication or login 342 may be accomplished when the vehicle repair shop 108 enters a name and a password in the claim processing desktop 332 which queries the security application 302 to verify identity. The security application 302 may then query the shop database 131 or a similar database (e.g., which manages the relationships between the insurance companies and service providers to promote competition and provide customers with fact-based recommendations). The query of the shop database 131 may then validate that the user is legitimate while identifying the user's level of access to the insurance company information.

Once the vehicle repair shop 108 is authenticated to the insurance company system 300 and the user is successfully logged in to the VICMA 330, in a step 204, the claim processing server 105, as part of the assignment module 326, transfers the assignment data to a vehicle repair estimating system 334. This may include transferring the claim files assigned to the vehicle repair shop 108 by the insurance company. The claim processing system 320 may transfer or pre-load data 344 into the shop application estimating database by extracting information from the insurance company data and populating the necessary fields in the shop database 131 or claims database 129, while generating an assignment request. The assignment request may include information about the claim and the estimate.

The next step, a step 206, the VICMA 330, through an adapter module 336, may transfer and translate the assignment data (e.g., estimate) to and from the vehicle repair estimating system 334. There are two different scenarios where this may take place. First, if the customer's vehicle was inspected by the insurance company (e.g., drive-in, etc.), the vehicle repair shop 108 may receive the estimate as part of the transferred claim file. The estimates may then be directly transferred 346 to the vehicle repair shop's estimating system 334 for further processing. The processing may include viewing and verifying the estimate 348 or modifying and sending a revised estimate through the claim processing system 320 back to the insurance company system 300.

Second, in the case where the customer goes directly to the vehicle repair shop 108, the vehicle repair shop 108 creates an estimate. Once the estimate is created, the vehicle repair shop 108 provides the insurance company system 300 with the estimate by transferring the estimate 346 through the claim processing system 320 where it may be translated through an adapter module 336 into a form acceptable by the insurance company. The adapter module 336 is defined by the computer readable instructions from the VICMA 330. The VICMA 330 may have one or multiple adapter modules 336 which translate data between the VICMA 330 and a first or second (or third, etc.) vehicle repair estimating system 334. If the vehicle repair shop 108 is using a different estimating system 334, then the claim processing system 320 may translate the assignment data (e.g., claim and estimate data) into a format accepted by the vehicle repair shop's claims system. The claim processing system 320 may translate this data using a translation application 322 within the claim processing system 320. Different vehicle repair shops 108 may use different estimating systems 334. The translation application 322 will translate the output and input into each of these different estimating systems 334. The VICMA 330 allows vehicle repair shops 108 to use whatever estimating systems 334 they choose. The claim processing system 320 may also encrypt the data transmitted over the internet to protect the privacy of the customer and to ensure the information is secure.

In the next step, 208, the estimate data may then be sent to the VICMA from the vehicle repair estimating system. The assignment module 326 may transfer the estimate data and assignment data from the vehicle repair estimating system 334 and then assign a corresponding repair to the vehicle repair shop 108.

In the next step, 210, the VICMA may then review the estimate data for compliance with a set of front-end business rules. These front-end rules are normally contract-based. The VICMA may review the estimate data with respect to charges aligning with the contract the vehicle repair shop signed with the insurance company. These contract-based features may include labor rates, chargeable hours per particular task, or any other aspect of the work covered by the contract. If the front-end rules are not met, the vehicle repair shop 108 normally corrects the errors and resubmits the assignment request for further processing to the insurance company. This review could also include a review of the assignment data by the VICMA 330.

Following the estimation process and after the vehicle repair shop 108 has completed the review based on the front-end rules in step 210, the estimate data or assignment data may be reviewed by a set of back-end rules by the insurance company system 300. Generally, if the estimate data does not meet the back-end rules, a reinspection is required. During the reinspection, the VICMA, through the assignment module, may rerun the same set of front-end rules executed at the vehicle repair shop, and may also run a set of back-end rules (BERs). Front-end rules are normally contract-based. The VICMA may review the estimate with respect to charges aligning with the contract the vehicle repair shop signed with the insurance company. These contract-based features may include labor rates, chargeable hours per particular task, or any other aspect of the work covered by the contract. If certain errors are found, the insurance company system 300 may send the estimate back to the vehicle repair shop 108 to correct and re-submit. Or also, if a certain other set of errors are found, the insurance company system 300 may correct the identified errors and then move on and evaluate the back-end rules.

The back-end rules, as reviewed in step 212, may be based on or indicate whether the estimate aligns with the damage described (e.g., in the case of a front-end collision, the system would flag a rear tail light assembly indicated as needing repair). Each discrepancy may be scored and at the end of the review, a final score is calculated. Depending on score thresholds, the back-end business rules define what further specific action should be taken.

Example

BER<50—PASS; the claim is cleared for further processing;
BER>50—generate report and send file to reinspection for output review The reinspection scores may be used as part of a performance rating method that measures the accuracy and effectiveness of the vehicle repair shop 108 relative to others in the market. The reinspection scores are then tabulated and may be displayed and stored using a reinspection report.

The insurance company system 300 may create a reinspection report. In a step 214, the VICMA 330 may receive a set of inspection data from the insurance company. This inspection data may be in the form of the reinspection report. The reinspection report may include: claim number, owner name, estimate version, appraisal source, reinspection type, reinspection location, reinspector's name, repair phase, reinspection completion date, and reinspector notes.

In a step 216, a read-only copy of the reinspection report may be downloaded and reviewed 354 by the vehicle repair shop 108 by linking through web browser on the claims processing system desktop application 320. If discrepancies are listed in the reinspection report, the vehicle repair shop 108 then transfers a change request form through the claims processing translator system 322 which will allow the vehicle repair shop 108 to enter corrected information using its estimating system 334. In a step 218, the VICMA updates the estimate data based on the reinspection and reinspection report. Once the data is corrected, a supplement shop estimate may be transferred to the insurance company system 300 via the claim processing translator system 322. The final financial processing on completion of repairs, EFT, might not process until all required reinspection requests are corrected and supplement shop estimates are transferred to the insurance company.

The change request form may also include additional quality information in the form of: estimate accuracy percentage, opportunity percentage, dollar accuracy, and dollar opportunity in terms of a percentage of costs.

Examples

Estimate Accuracy (%)=(Insurance Company estimate value/Shop estimate value)×100%

Opportunity (%)=100%−Estimate Accuracy %

Dollar Accuracy (USD)=Insurance Company Estimate (USD)×Estimate Accuracy/100

Dollar Opportunity (USD)=Shop Estimate−Dollar Accuracy

Estimate accuracy may be defined by the ratio of the insurance company estimate divided by the vehicle repair shop estimate. When the shop estimate is more than the insurance company estimate, the value is less than 100%. However, if the vehicle repair shop estimate is less than the insurance company estimate, the value is greater than 100%.

The reinspection report may also include estimate exceptions. Estimate exceptions may highlight information associated to the claims that are identified by the insurance company as being in error. The types of information that may be highlighted may include vehicle information (vehicle year, mileage, equipment level). Other exceptions may include estimate line items. Estimate line items include listing of parts, labor and associated task duration (hours), and price. The reinspection report may also include a summary section that tabulates the identified tasks, hours, associated labor rates, and total amount of the reinspection costs. This information may also or alternatively be used by the performance module 337 and/or the financial module 339.

Financial Module

In a step 220, the VICMA 330 provides the capability to track real-time financial status of the vehicle repair through the use of a financial module 339 or an Electronic Funds Transfer (EFT) system. The financial module 339 tracks two different types of claim transactions: verification requests and payment remittance. The financial module 339 provides for transaction information to be viewed as either including all claims assigned to the vehicle repair shop 108 (many vehicles) or by individual claims.

For verification requests, the financial module 339 verifies that all transaction information is accurate and associated to the correct claim numbers. If errors are detected, the insurance company system 300 may list the error messages on the "EFT Financials" screen and a verification request may be submitted to the vehicle repair shop 108 to correct the error.

When the vehicle repair shop 108 starts the vehicle repair, the vehicle repair shop 108 may enter the status change to "started" in the assignment screen 600. The status change may be transmitted via the web link through the claim processing system 320 to be translated by the translation application 322 if needed. The status change may be registered in the claims database 129. Once the vehicle repair shop 108 completes the repair, a user at the vehicle repair shop 108 updates the vehicle repair shop workstation 107 to "vehicle delivered." The insurance company system 300 then may transfer a status change by the same process which will update the claim status in the claims database 129 to "complete," in turn authorizing the EFT system to make the payment electronically. Therefore, there is no need for the vehicle repair shop 108 to wait for payment by conventional methods such as checks, etc. The EFT process may also begin when a user at the vehicle repair shop 108 updates the vehicle repair shop workstation 107 to "vehicle delivered" or "repair complete."

All transactions associated with the vehicle repair shop 108 or a particular claim may be viewed 350 by the vehicle repair shop user and/or insurance company's claim representative to quickly determining payment status or issues.

Performance Module

In a step 222, a performance module 337 compiles vehicle repair shop performance data, or Key Performance Indicator (KPI) data, that calculates a score and ranks the vehicle repair shop relative to other vehicle repair shops in the market. Finally, in a step 224, the VICMA 330 gathers vehicle repair shop metrics by routing information through the claim processing translation system 322. The KPI data may be compiled for individual claim transactions. When all data fields are captured for a given claim, the claim file may be added to a vehicle repair shop file that includes claim statistics for all claims the vehicle repair shop 108 has processed with the insurance company.

The vehicle repair shop file may include scores for customer service, repair quality (pass ratio), or cycle time. It may also include estimate metrics that measure the vehicle repair shop's ability to estimate total repair cost, average part amount for estimate, and average hours per estimate (with a breakdown of refinish, repair, and replace). The report may also include a measure of estimate accuracy that measures the difference between the vehicle repair shop's estimates and the final bill, difference between submitted and reinspection results. Another quality criterion may measure the number of recommended certifications the vehicle repair shop has relative to the desired level of certification the insurance company has set or that the collision repair industry has set as a desirable industry standard.

The insurance company system 300 and shop database 131 may compile the individual vehicle repair shop files over a specified time (e.g., one month, six months, etc.) and then may calculate rankings relative to the local market. The report may be created and then viewed by the vehicle repair shop 108 by linking through the web browser on the claims processing application 332. The vehicle repair shop 108 may have only view-only rights 352 and may have no access for changing any information. This aspect of the invention allows the performance module 337 to gather performance metrics and automatically update the KPI performance report when the individual claim files are completed. The invention further provides the vehicle repair shops 108 with the latest performance rating and ranking feedback which may more quickly help them identify ways to improve.

Illustrative User Interface

FIGS. 4-16 illustrate a set of illustrative user interface screens which represent an aspect of the invention. Those skilled in the art will recognize that these are only example user interface screens and that a wide range and variety of user interface screens may be possible for this invention. As used herein, the term "exemplary" is not intended to mean "best" or "ideal," but rather is used synonymously with the term "illustrative."

Figure 4:
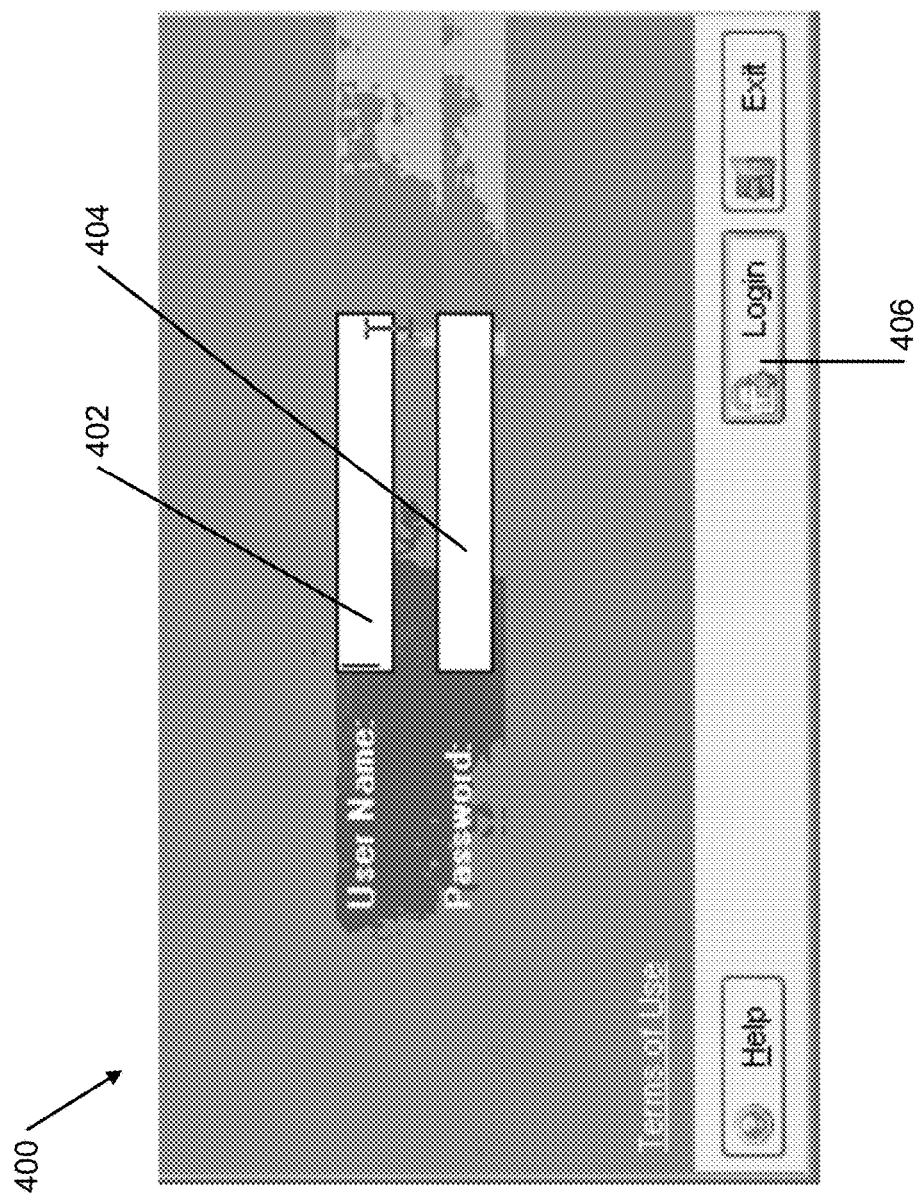
FIGS. 4-16 show illustrative screen shots for one or more aspects of the invention.

FIG. 4 illustrates an exemplary user interface screen 400 for authentication 342 that may be presented to a user of the repair shop application 330. The authentication screen 400 may enable the user to enter their user name 402 and password 404. The user may then select a "Login" button 406 to begin the authentication process for the user of the VICMA 330.

Figure 5A:
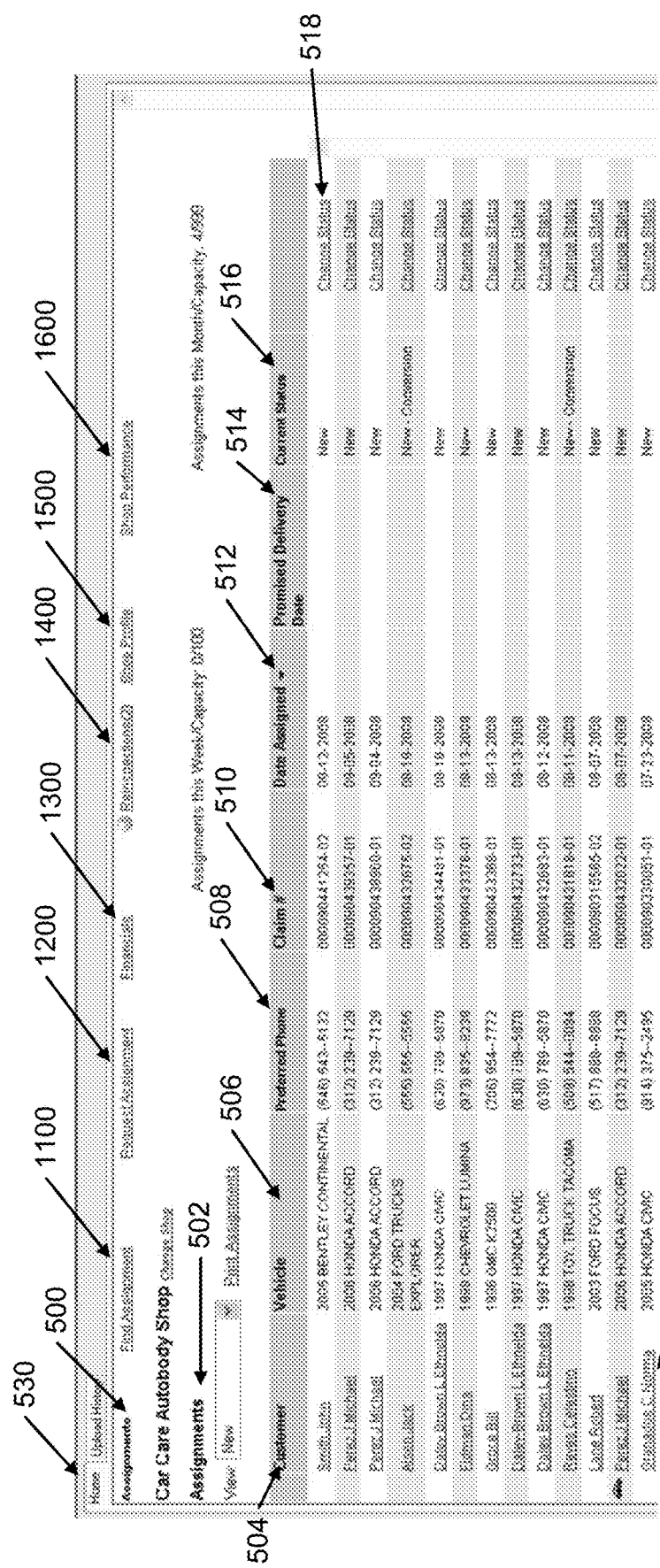
Figure 5B:
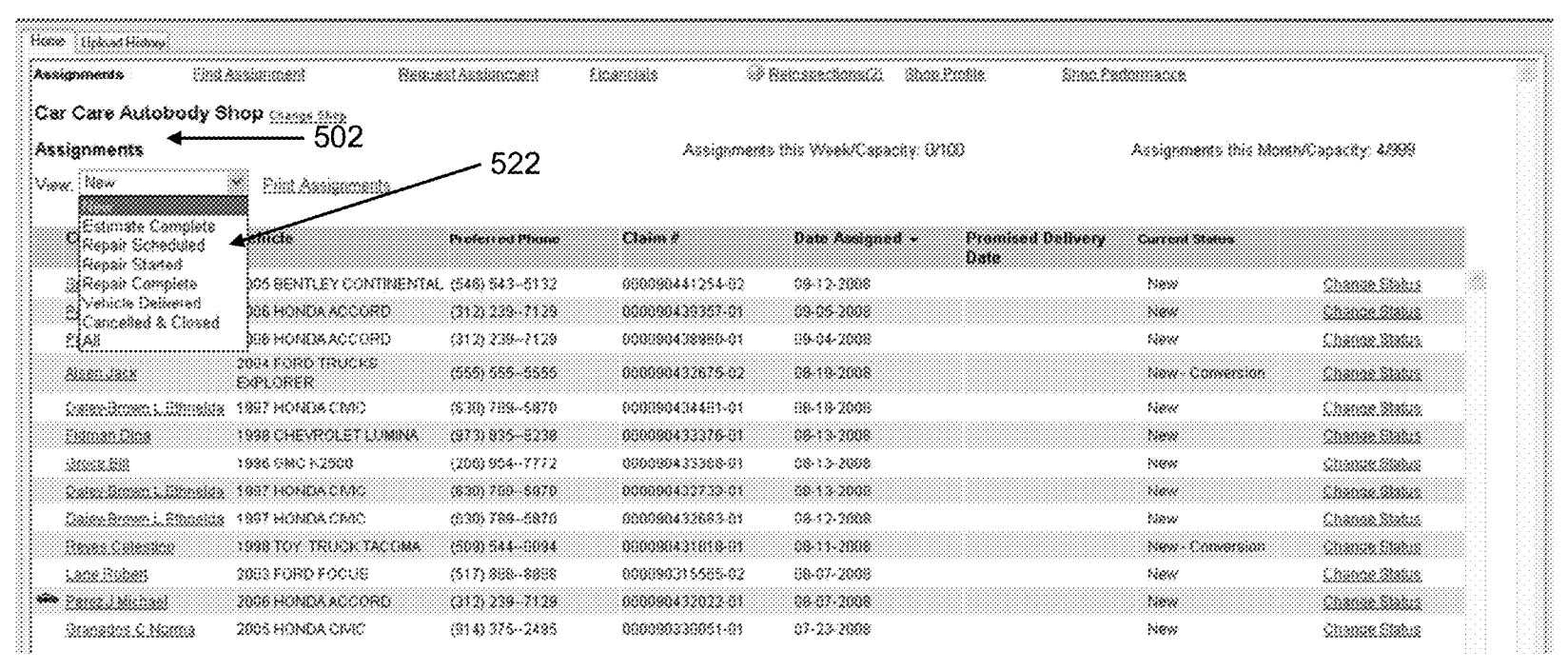

FIGS. 5A and 5B illustrate exemplary "Assignments" user interface screens 502 for the present invention. On each of these "Home" screens 530, the user may select any one of the following links across the top of the screen which will take the user to a specified action within the VICMA 330. These links may include: Assignments 500, Find Assignment 1100, Request Assignment 1200, Financials 1300, Reinspections 1400, Shop Profile 1500, or Shop Performance 1600. Each of these categories will be described in further detail below.

The user may select the "Assignments" link 500, the Assignment screen 502 will be displayed. As illustrated in FIG. 5A, the transferred claim assignments may be listed in the Assignments screen 502. As illustrated in FIG. 5A, the following categories may be listed for each claim assignment: customer 504, vehicle 506, preferred phone 508, claim number 510, date assigned 512, promised delivery date 514, and current status 516. The user may also be able to change the status of a given claim through the "Change Status" link 518. The viewable list of claims may be sorted by a category by selecting that given category area. As illustrated in FIG. 5B, this exemplary interface screen 502 may have various views for the user. The user, from a drop-down selection box 522, may select views such as: new, estimate complete, repair scheduled, repair started, repair complete, vehicle delivered, cancelled & closed, and all. In addition to the user having the ability to access and view this status information, others such as insurance agents, rental car companies, and customers may also have the ability to access and view this status information.

Figure 6:
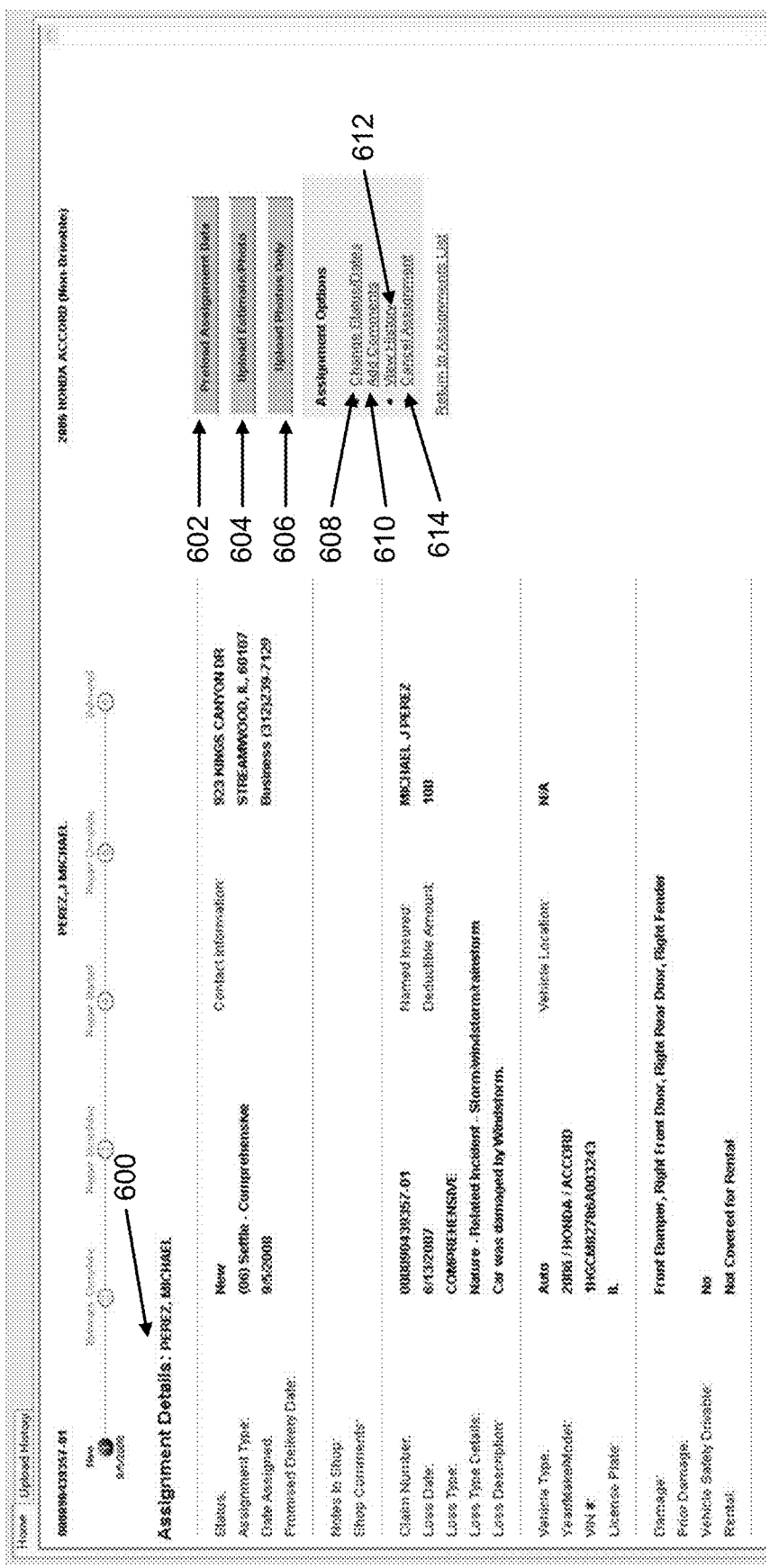

To view further assignment details for an individual claim or customer, the user may select a specific name 520 in the customer 504 category. FIG. 6 illustrates an exemplary user interface screen for Assignment Details 600. The Assignment Details screen 600 may list various information which can include status, assignment type, date assigned, contact information, promised delivery data, notes to shop, shop comments, claim number, named insured, loss date, loss type, loss type details, loss description, deductible amount, vehicle type, vehicle location, year/make/model, Vehicle Identification Number, license plate, damage description, prior damage, vehicle safety drivable, and rental.

Figure 7A:
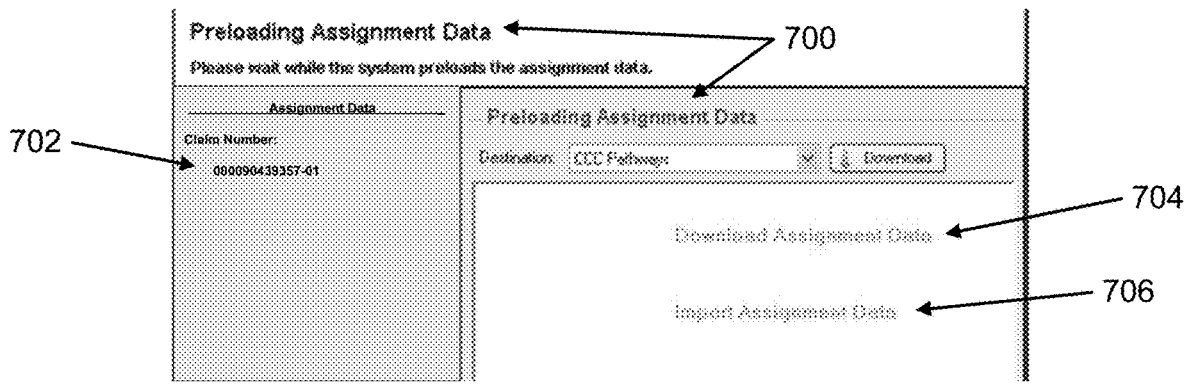
Figure 7B:
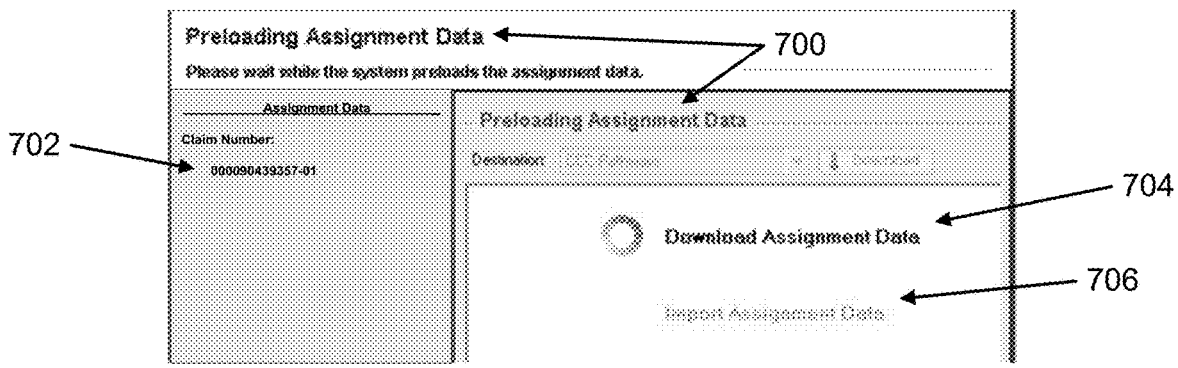
Figure 7C:
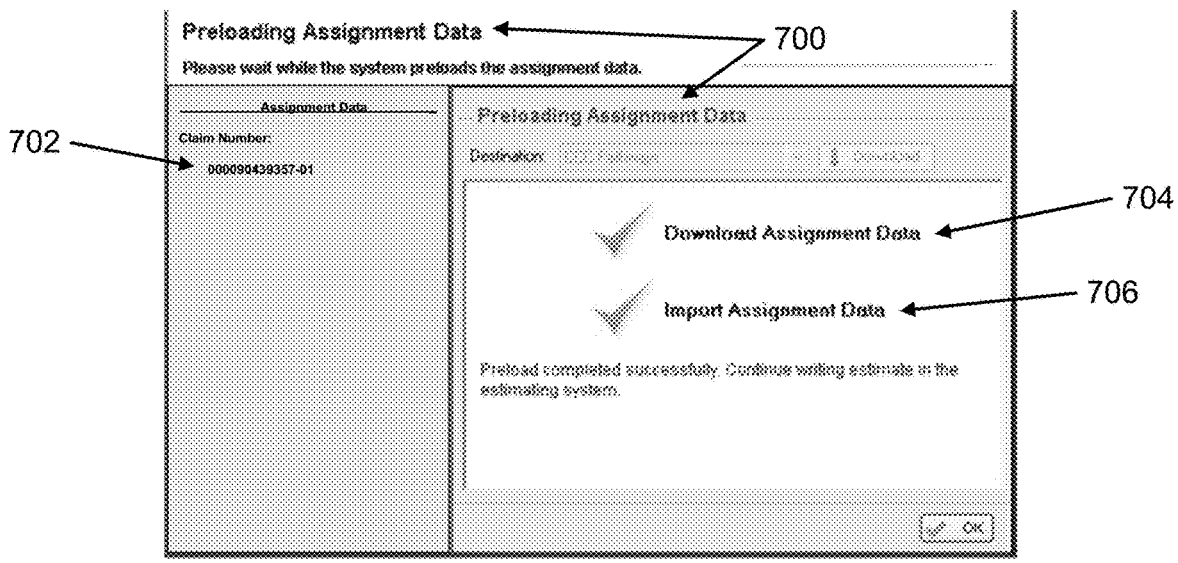

Also on this assignment detail screen 600, the user may take various actions associated with that specific claim. First, the user may select a "Preload Assignment Data" button 602. When the "Preload Assignment Data" button 602 is selected, the assignment data is transferred from the claim processing database 324 to the VICMA 330. FIGS. 7A-7C illustrate exemplary user interface screens for preloading assignment data 700. The preloading assignment data screen 700 lists the claim number 702 as well as the status of the transfer of the assignment data 704 and the importing of assignment data 706.

Figure 8A:
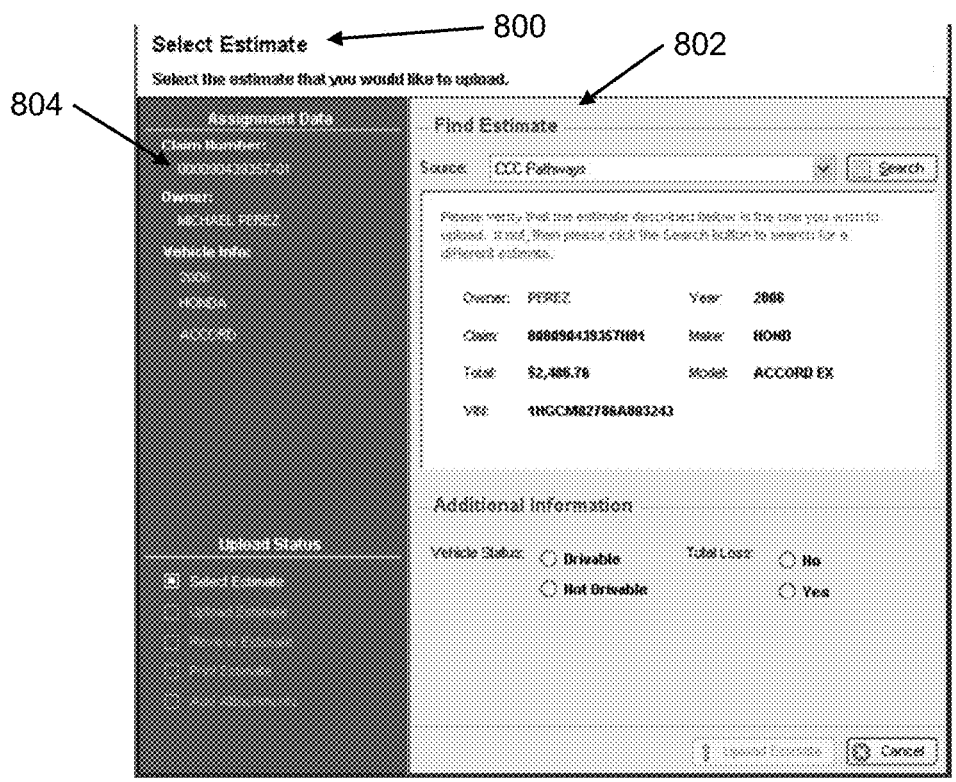
Figure 8B:
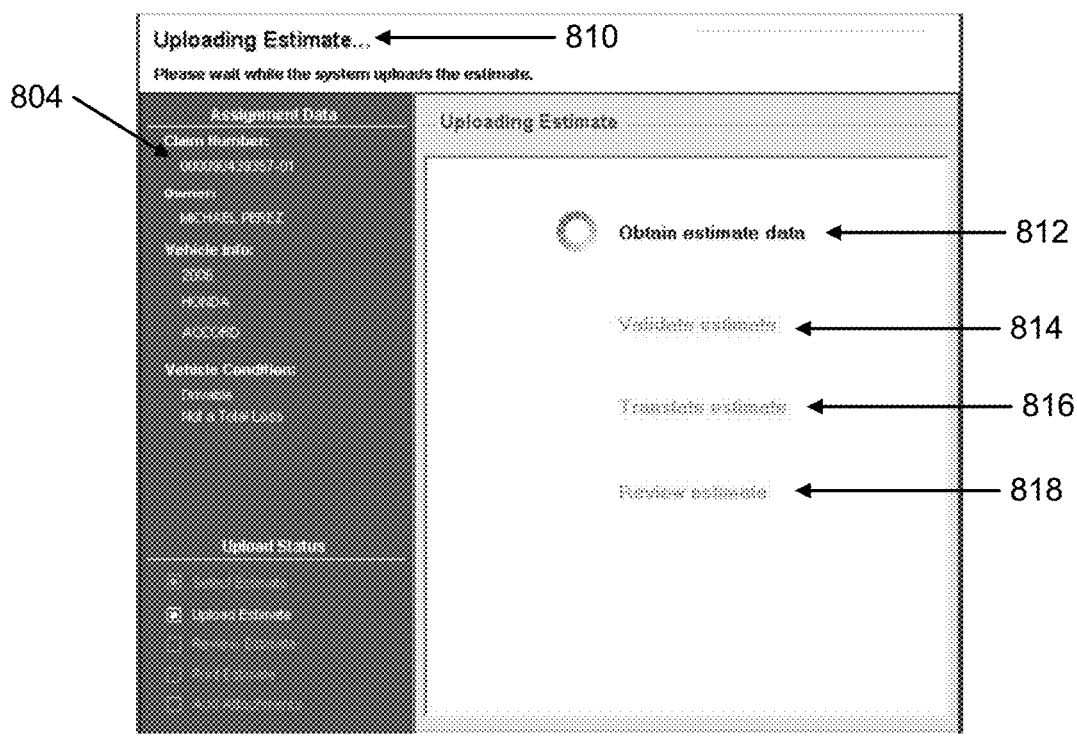
Figure 9:
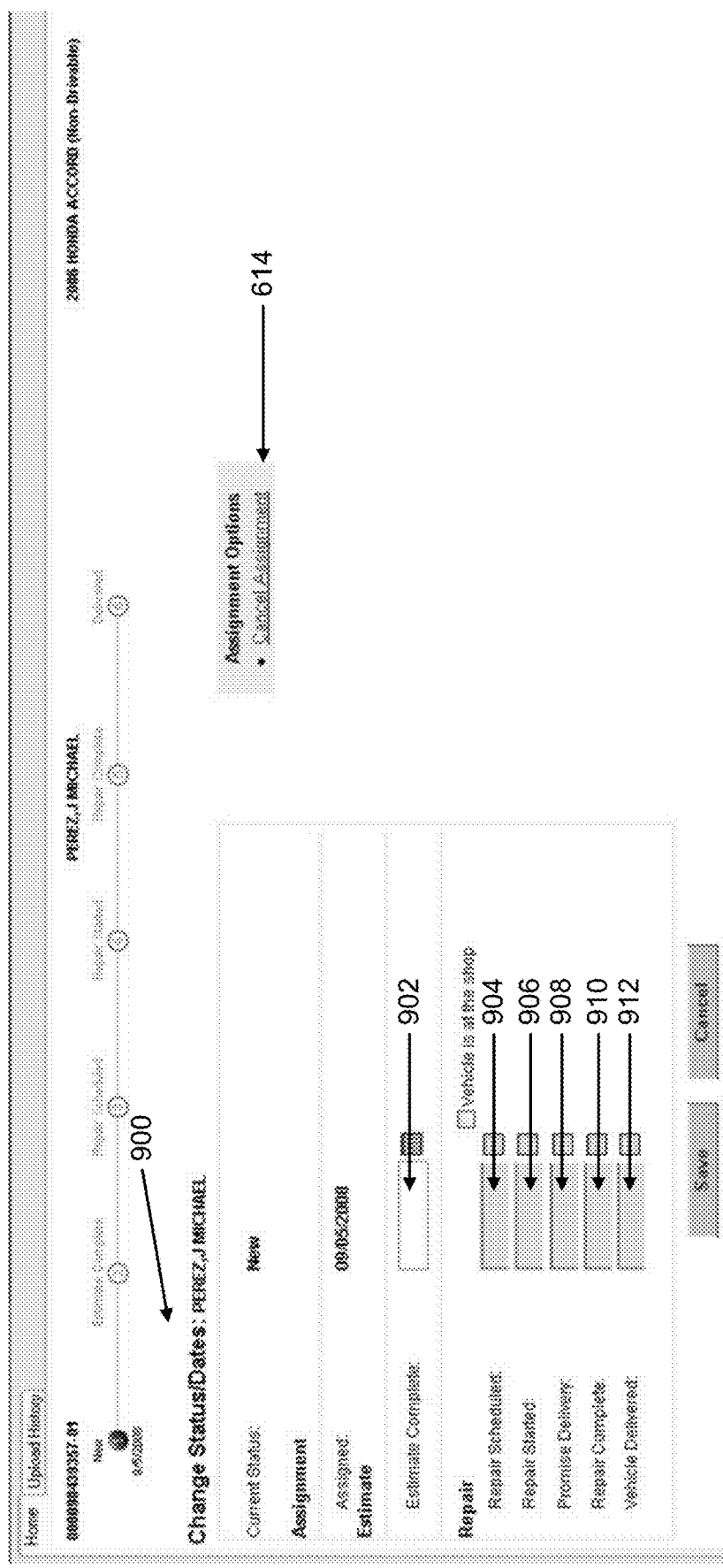

Second, on FIG. 6, the assignment detail screen, the user may select an "Upload Estimate/Photo" button 604. When the "Upload Estimate/Photo" button 604 is selected, the VICMA 330 uploads the estimate from the claim processing database 324 to the VICMA 330. In FIG. 8A, an exemplary user interface screen illustrates how the user may select the estimate 800 and find the estimate 802 for a given claim number 804. Once the estimate is selected 800, in FIG. 8B, an exemplary user interface screen illustrates the system uploading the estimate 810. While uploading the estimate, the system obtains the estimate 812, validates the estimate 814, translates the estimate 816, and reviews the estimate 818. A photo may also be uploading during this step along with the estimate. Furthermore, the user may also select the "Upload Photos Only" button 606 in order to only upload photographs.

Third, on FIG. 6, the assignment detail screen 600, the user may select to "Change Status/Dates" link 608. When the "Change Status/Dates" link 608 is selected, the user may change the status of the claim assignment or change various dates associated with the claim assignment on the Change Status/Dates user interface screen 900. Some examples of the dates which may be changed are: estimate complete date 902, repair scheduled date 904, repair started 906, promise delivery 908, repair complete 910, or vehicle delivered 912. Also on the Change Status/Dates screen 900, the user may select the "Cancel Assignment" link 614.

Figure 10:
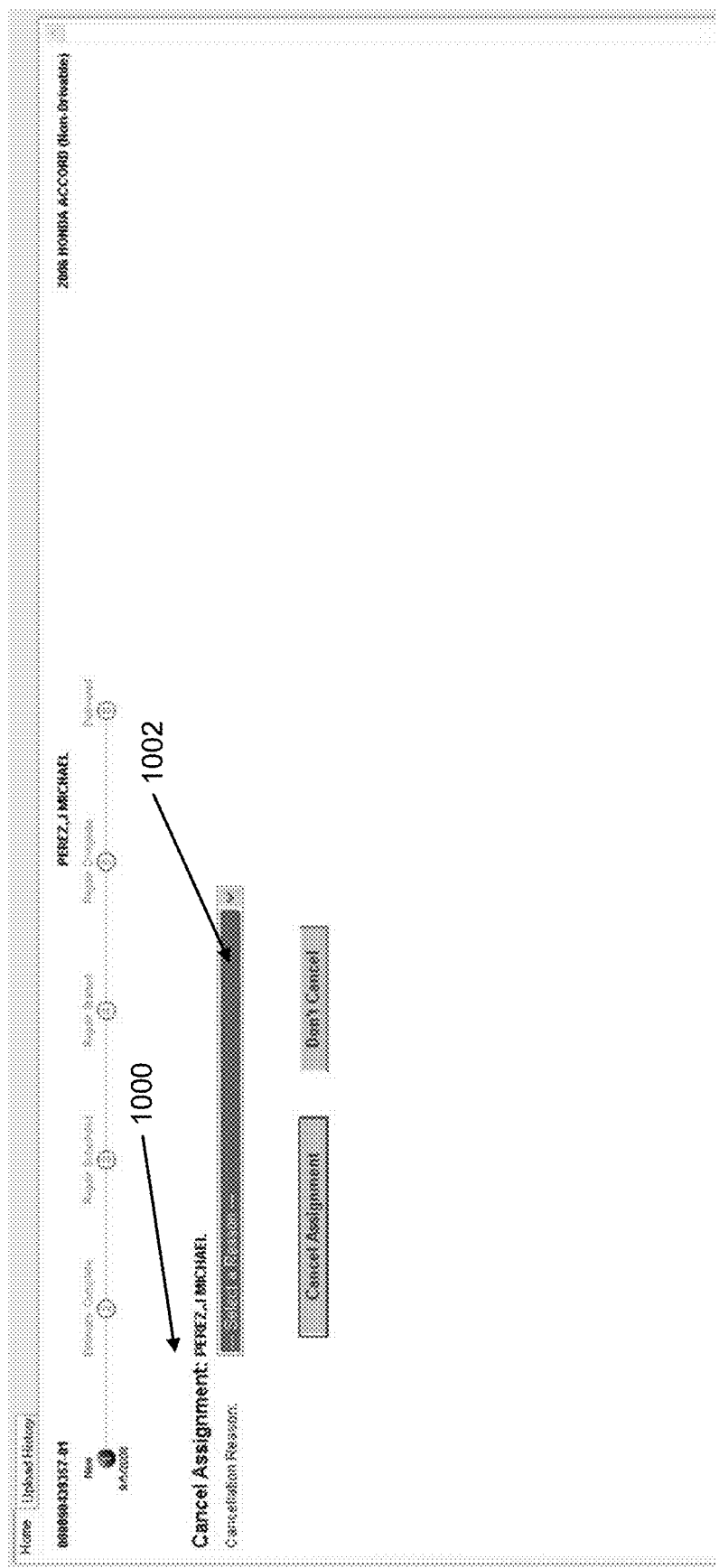

Fourth, on FIG. 6, the assignment detail screen 600, the user may select the "Add Comments" link 610 which may allow the user to include comments surrounding the particular claim assignment. Also, the user may select the "View History" link 612 which may allow the user to view the claim history from the initiation of the claim assignment through the completion of the claim assignment. Lastly, on the assignment detail screen 600, the user may select the "Cancel Assignment" link 614 (this link is the same as the "Cancel Assignment" link on FIG. 9) in order to cancel the selected claim assignment. FIG. 10 illustrates an exemplary Cancel Assignment user interface screen 1000. On this Cancel Assignment screen 1000, the user may select a reason from a "Cancellation Reason" drop-down menu 1002.

Figure 11:
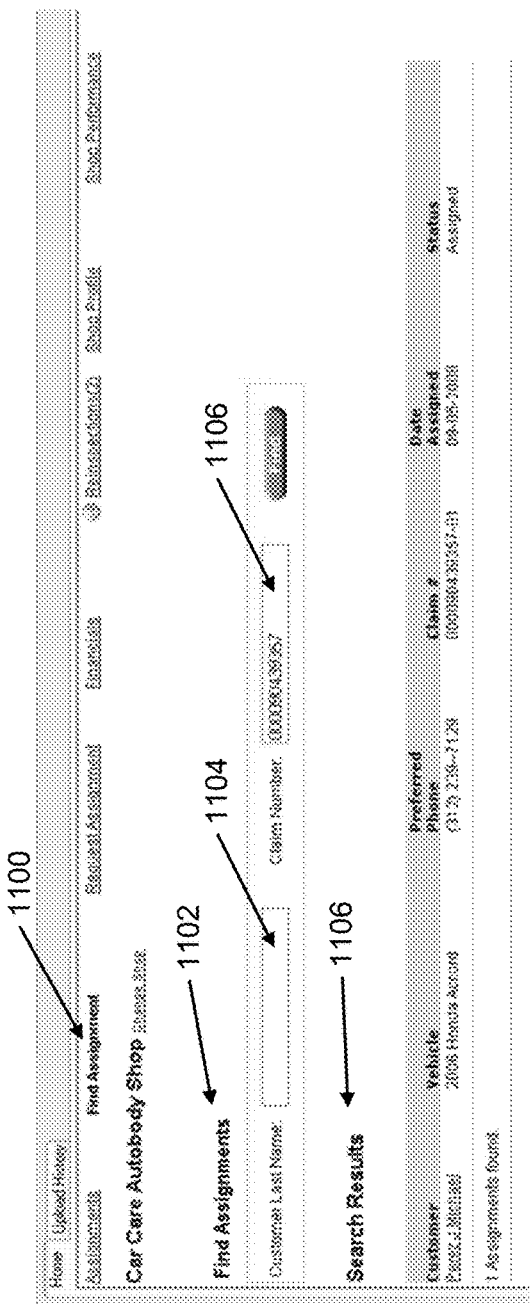

The user may select the "Find Assignment" link 1100 to search various assignments on the Find Assignment screen 1102. FIG. 11 illustrates an exemplary Find Assignments user interface screen 1102. The Find Assignment screen 1102 may allow the user to search the claim database 129 by customer last name 1104 or claim number. The VICMA 330 will then search the claim database 129 and list the search results 1106 and all claim assignments which match the given search criteria.

Figure 12:
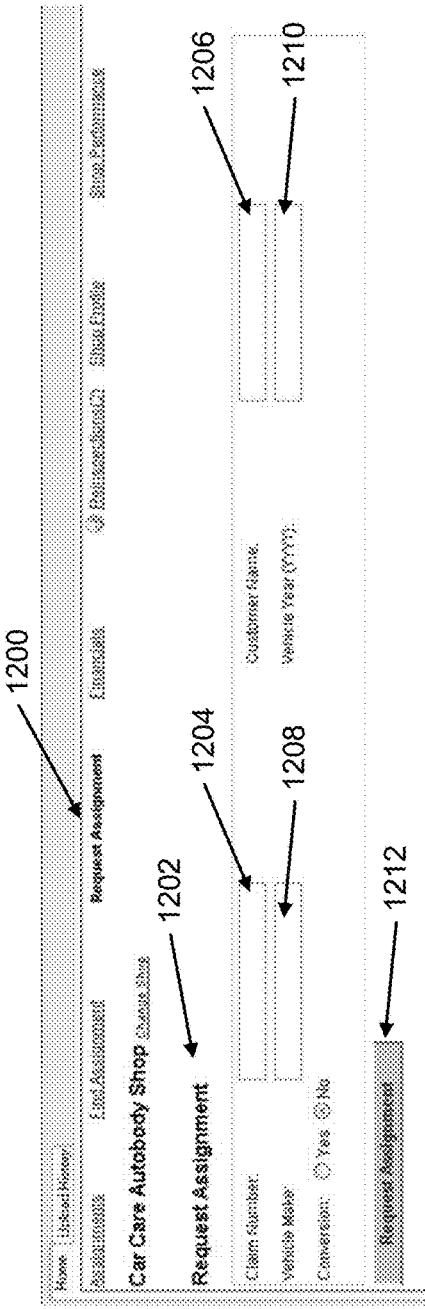

The user may select the "Request Assignment" link 1200 to request an assignment on the Request Assignment screen 1202. FIG. 12 illustrates an exemplary Request Assignment user interface screen 1202. The Request Assignment screen 1202 may allow the user to request a certain assignment by claim number 1204, customer name 1206, vehicle make 1208, or vehicle year 1210. The user may then select the "Request Assignment" button 1212 and the VICMA 330 will then search the claim database 129 for the given claim request and then present the requested assignment on the Assignment Details screen 600, as illustrated in FIG. 6.

Figure 13A:
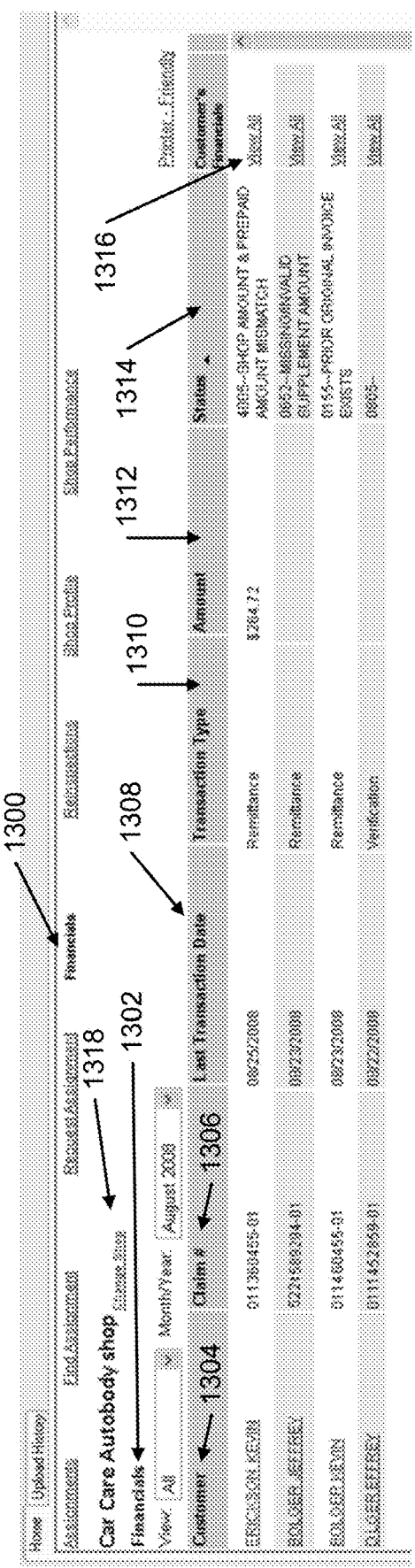
Figure 13B:
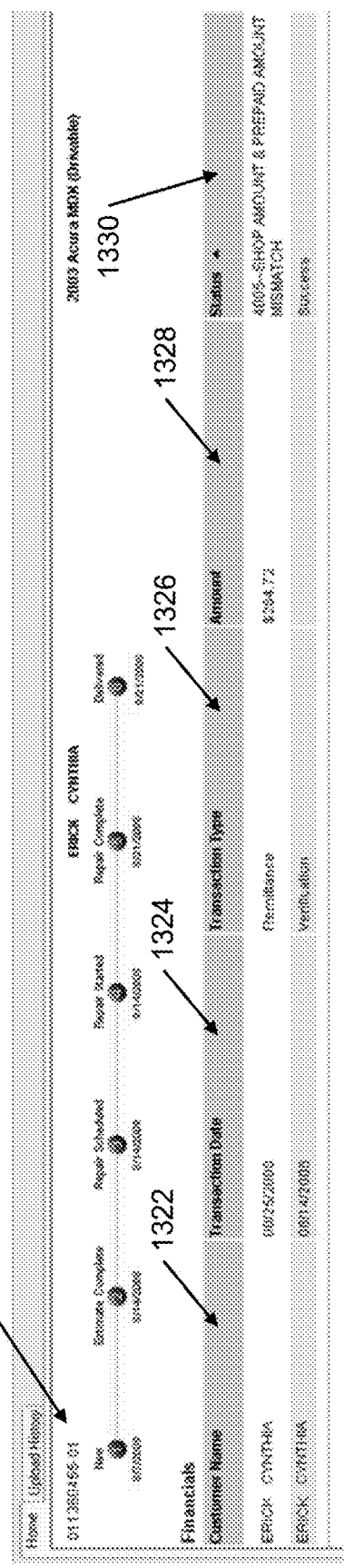

The user may select the "Financials" link 1300 to display the Financials screen 1302. FIGS. 13A and 13B illustrate exemplary user interface screens for the financial module 339 of the VICMA 330. FIG. 13A illustrates the Financial user interface screen 1302. The Financial screen 1302 may allow the user to view a customer's financial status in such categories as: customer name 1304, claim number 1306, last transaction date 1308, transaction type 1310 (e.g., remittance or verification), amount 1312, or status 1314. There may also be a selection for a "View All" link 1316 which allows the user to see the details of the financial customer or claim number. FIG. 13B illustrates the specific details from the "View All" link 1316 for the claim number 1320. On this screen, the following information is listed specifically for each financial transaction associated with the selected claim number: customer name 1322, transaction date 1324, transaction type 1326 (e.g., remittance or verification), amount 1328, or status 1330.

Figure 14A:
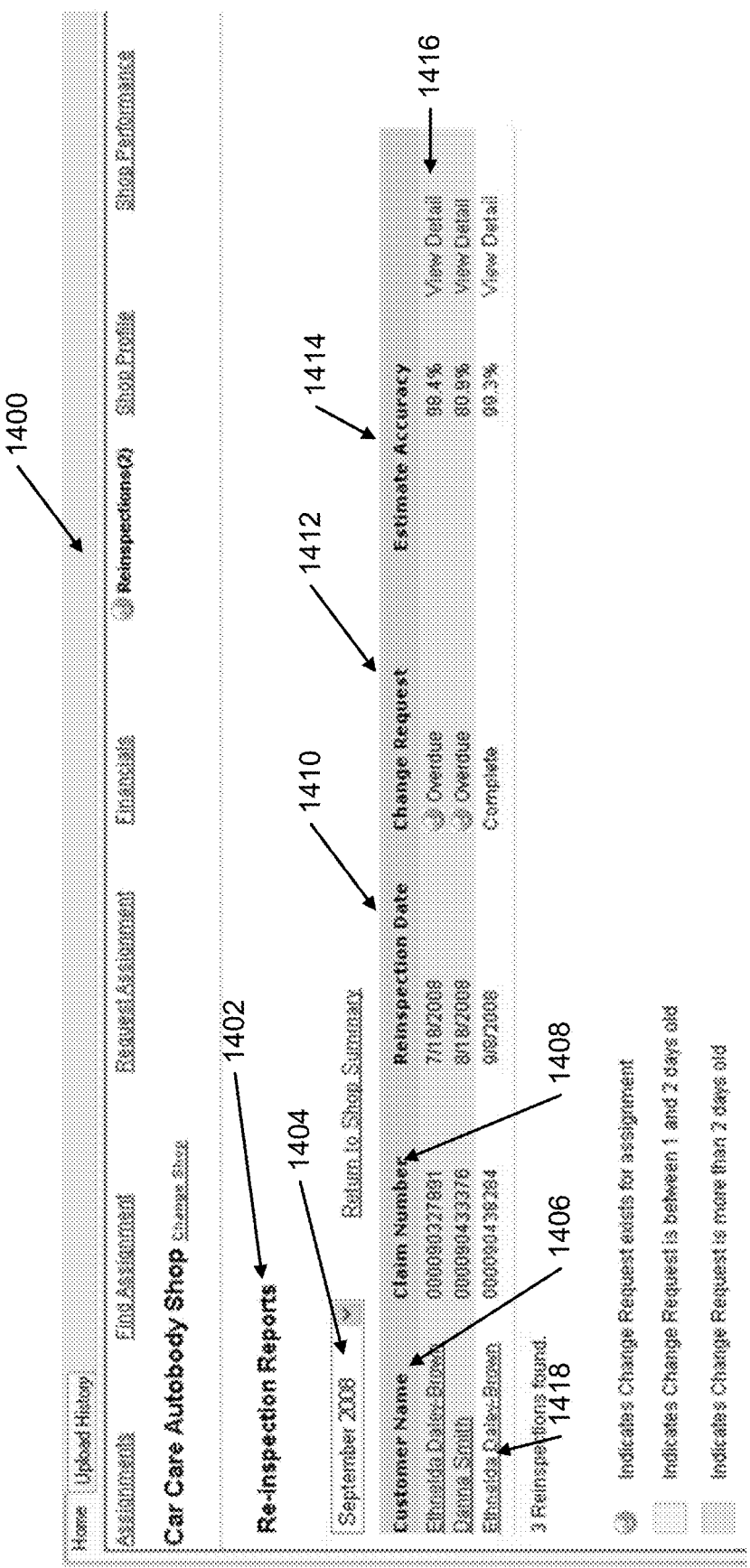
Figure 14B:
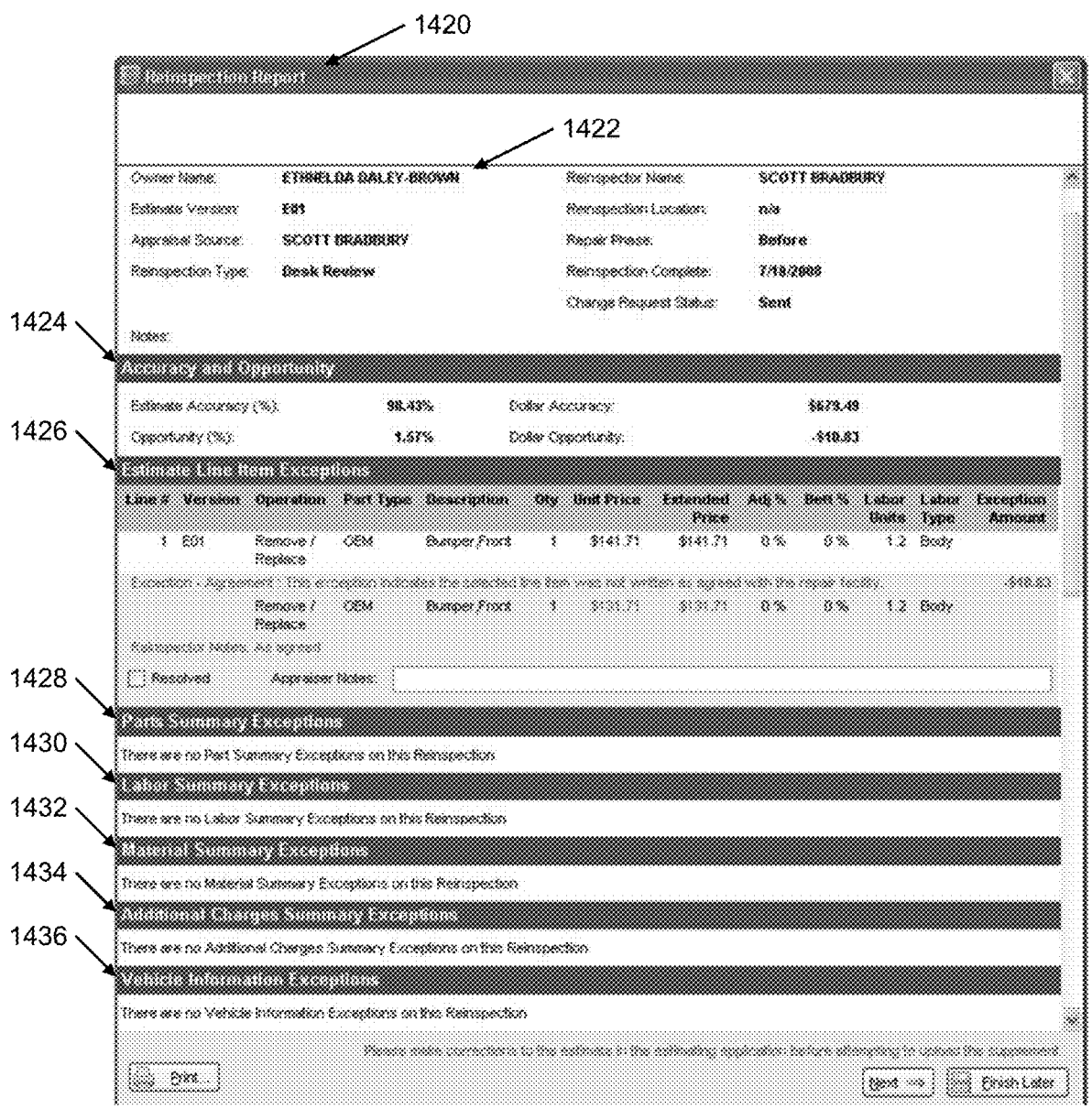

The user may select the "Reinspection" link 1400 to display the Reinspection Report screen 1402. FIG. 14A illustrates an exemplary Reinspection Report selection user interface screen 1402. The Reinspection Reports screen 1402 may list the available reinspection reports for a given month. The user may select the month from a month drop-down menu 1404. After the user selects the month, the available reinspection reports may be listed by: customer name 1406, claim number 1408, reinspection date 1410, change request 1412, and estimate accuracy 1414. A "View Detail" link 1416 may also be available for selection. FIG. 14B illustrates a reinspection report when the "View Detail" link 1416 is selected. The reinspection report 1420 as illustrated in FIG. 14B, may list general claim assignment details 1422, such as: owner name, reinspector name, estimate version, reinspection location, appraisal source, repair phase, reinspection type, reinspection complete, or change request status. The reinspection report 1420 may also list the accuracy and opportunity 1424, such as: estimate accuracy (%), dollar accuracy (USD), opportunity (%), or dollar opportunity (USD). The reinspection report 1420 may also list the estimate line item exceptions 1426, parts summary exceptions 1428, labor summary exceptions 1430, material summary exceptions 1432, additional charges summary exceptions 1434, or vehicle information exceptions 1436.

Figure 15A:
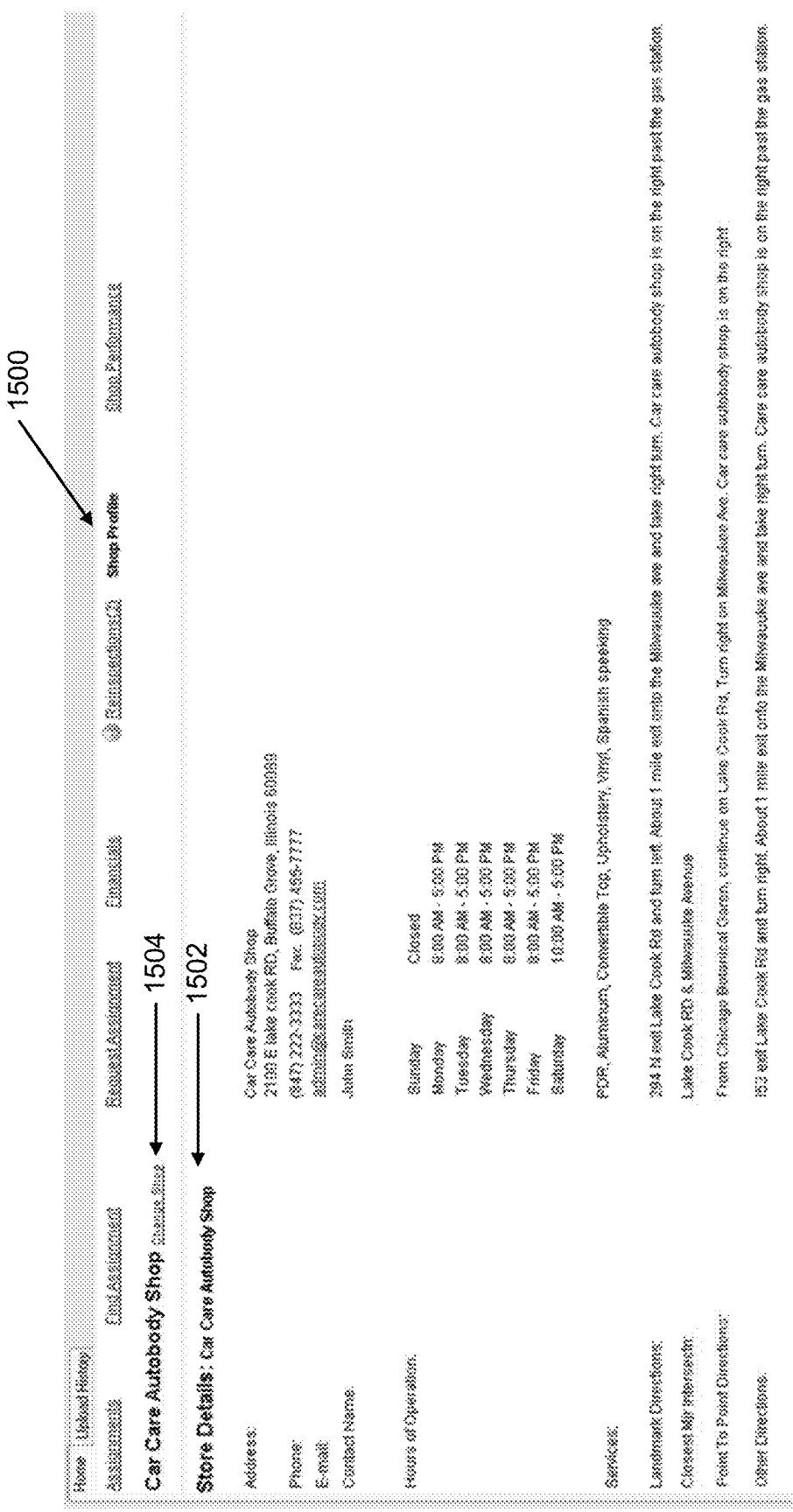
Figure 15B:
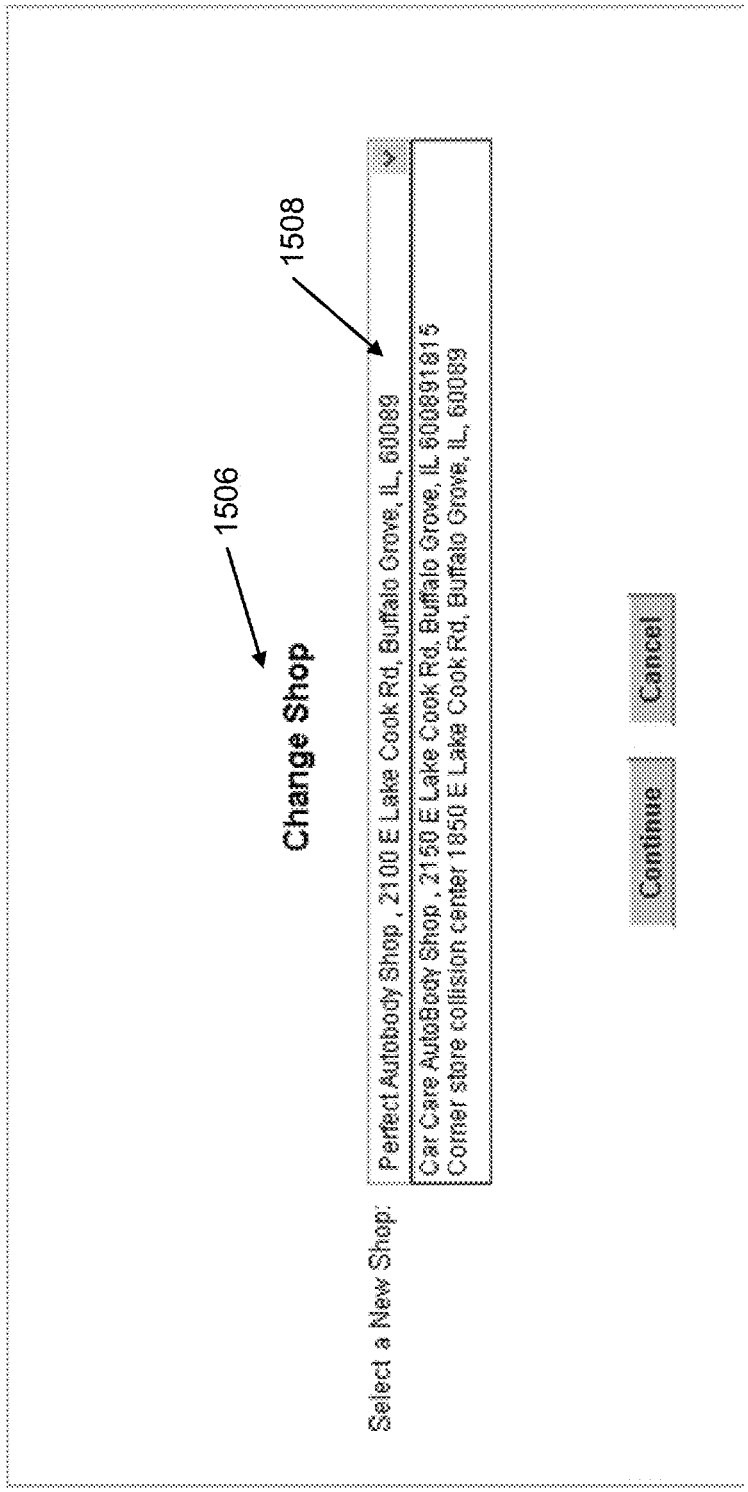

As illustrated in FIG. 15A, the user may select the Shop Profile user interface screen 1500. The Shop Profile screen 1500 may list the store details of the selected shop 1502. The following information may be listed for each selected shop 1502: address, phone, e-mail, contact name, hours of operation, services, or closest major intersection. The user may also change the selected shop by selecting the "Change Shop" link 1504. After selecting the "Change Shop" link 1504, the user may be taken to a "Change Shop" user interface screen 1506 as illustrated in FIG. 15B. The user may select a vehicle repair shop by selecting the shop from a drop-down selection list 1508 with various shops listed from the shop database.

Figure 16:
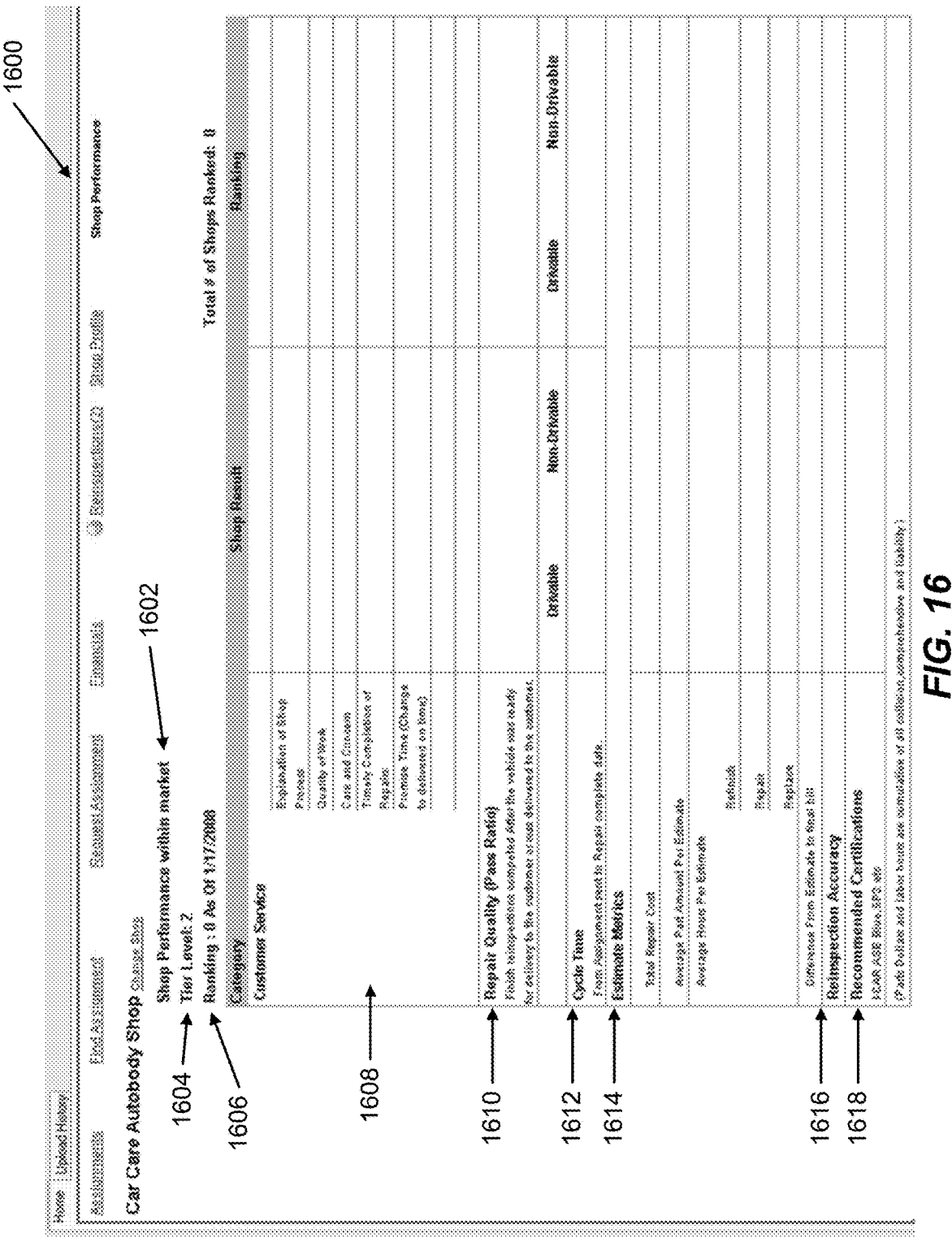

The user may select the "Shop Performance" link 1600 to display the Performance screen 1602. FIG. 16 illustrates an exemplary Shop Performance user interface screen 1602 from the Shop Performance module 1600 on the VICMA 330. The Shop Performance screen 1602 may include both the tier level 1604 and performance ranking (with "as of date") 1606. The Performance screen 1602 may also include the following categories: customer service 1608, repair quality (e.g., pass ratio) 1610, cycle time 1612, estimate metrics 1614, reinspection accuracy 1616, and recommended certifications (e.g., I-CAR, ASE Blue, SP2, etc.) 1618. The customer service category may further include: explanation of shop process, quality of work, care and concern, timely completion of repairs, or promise time (e.g., change to delivered on time). The estimate metrics category may further include: total repair cost, average part amount per estimate, average hours per estimate for refinish, repair, and replace, or the difference from estimate to the final bill. Each of these categories may have its own shop result number with an associated ranking.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An insurance claim system for improved interoperability between an insurance company server and a vehicle repair estimating system, the system comprising:
   a work request that includes a set of assignment data with information about at least one of a customer, a corresponding vehicle, or a corresponding loss of a vehicle;
   the insurance company server comprising at least one first computer processor and a user interface coupled to a network;
   the vehicle repair estimating system having at least one second computer processor and interconnected with the insurance company server via the network, the vehicle repair estimating system configured to create a repair estimate, wherein the repair estimate includes a set of estimate data of the corresponding loss of the vehicle; and
   a vehicle insurance claim management application operating on the insurance company server and the vehicle repair estimating system and executing a sequence of steps with the insurance company server and the vehicle repair estimating system that causes the insurance claim system to:
  receive the work request and the set of assignment data from the insurance company server;
  change the set of assignment data into a format accepted by the vehicle insurance claim management application, wherein the changing further includes encrypting the set of assignment data;
  transfer the changed and encrypted set of assignment data to the vehicle repair estimating system;
  receive the repair estimate with the set of estimate data from the vehicle repair estimating system, wherein the repair estimate with the set of estimate data includes information about the repair estimate for the corresponding loss of the vehicle, and further wherein the repair estimate is uploaded from the vehicle repair estimating system to the vehicle insurance claim management application;
  change the set of estimate data into the format accepted by the vehicle insurance claim management application, wherein the changing further includes encrypting the set of estimate data;
  analyze and audit the set of estimate data for compliance with a set of contract-based conditions;
  provide a performance rating to a vehicle repair shop associated with the vehicle repair estimating system, the performance rating based at least on the repair estimate;
  transmit the performance rating to the vehicle repair estimating system; and
  based on the change and the analyzing of the set of estimate data, transfer and communicate the changed and encrypted set of estimate data to the insurance company server.

2. The insurance claim system of claim 1, wherein the vehicle insurance claim management application in communication with the insurance company server and the vehicle repair estimating system causes the insurance claim system further to:
  receive a second set of assignment data from the insurance company server via an assignment user interface, wherein the second set of assignment data includes information about at least one of a second customer, a corresponding second vehicle, or a corresponding second loss with the corresponding second vehicle;
  change the second set of assignment data into the format accepted by the vehicle insurance claim management application, wherein the changing further includes encrypting the second set of assignment data;
  transfer the changed and encrypted second set of assignment data to the vehicle repair estimating system;
  receive a second set of estimate data of the corresponding second loss of the corresponding second vehicle from the vehicle repair estimating system, wherein the second set of estimate data includes information about a second repair estimate for the corresponding second loss of the corresponding second vehicle, and further wherein the second repair estimate is uploaded from the vehicle repair estimating system to the vehicle insurance claim management application; and
  change the second set of estimate data into the format accepted by the vehicle insurance claim management application, wherein the change further includes encrypting the second set of estimate data.

3. The insurance claim system of claim 1, wherein the vehicle insurance claim management application in communication with the insurance company server and the vehicle repair estimating system causes the insurance claim system further to: store and provide payment status information for the set of assignment data.

4. The insurance claim system of claim 1, wherein the insurance company server is coupled to a web server through which users interact with the vehicle insurance claim management application and the insurance claim system.

5. The insurance claim system of claim 4, wherein the web server includes a claim processing system used to store the set of assignment data for further processing.

6. The insurance claim system of claim 1, wherein the vehicle insurance claim management application in communication with the insurance company server and the vehicle repair estimating system causes the insurance claim system further to: provide a timeline indicating a plurality of milestone dates corresponding to the work request.

7. The insurance claim system of claim 1, wherein the vehicle insurance claim management application in communication with the insurance company server and the vehicle repair estimating system causes the insurance claim system further to: provides an interactive calendar through which a vehicle repair shop schedules a repair of the vehicle corresponding to the work request.

8. An insurance claim system for improved interoperability between an insurance company server and a vehicle repair estimating system, the system comprising:
  a first work request that includes a first set of assignment data with information about at least one of a first customer, a corresponding first vehicle, or a corresponding first loss of the corresponding first vehicle;
  a second work request that includes a second set of assignment data with information about at least one of a second customer, a corresponding second vehicle, or a corresponding second loss of the corresponding second vehicle;
  the insurance company server comprising at least one first computer processor and a user interface and coupled to a network;
  the vehicle repair estimating system having at least one second computer processor and interconnected with the insurance company server via the network, the vehicle repair estimating system configured to create a repair estimate; and
  a vehicle insurance claim management application operating on the insurance company server and the vehicle repair estimating system and executing a sequence of steps with the insurance company server and the vehicle repair estimating system that causes the insurance claim system to:
    receive the first work request and the first set of assignment data from the insurance company server;
    receive the second work request and the second set of assignment data from the insurance company server via an assignment user interface;
    change the first set and the second set of assignment data into a format accepted by the vehicle insurance claim management application, wherein the changing further includes encrypting the first set and the second set of assignment data;
    transfer the changed and encrypted first set and the second set of assignment data to the vehicle repair estimating system;
    receive a first set of estimate data from the vehicle repair estimating system, wherein the first set of estimate data includes information about a first repair estimate for the corresponding first loss of the corresponding first vehicle, and further wherein the first repair estimate is uploaded from the vehicle repair estimating system to the vehicle insurance claim management application;

receive a second set of estimate data from the vehicle repair estimating system, wherein the second set of estimate data includes information about a second repair estimate for a second loss of the corresponding second vehicle, and further wherein the second repair estimate is uploaded from the vehicle repair estimating system to the vehicle insurance claim management application;

change the first set and the second set of estimate data into the format accepted by the vehicle insurance claim management application, wherein the changing further includes encrypting the first set and the second set of estimate data;

analyze and audit the first set and the second set of estimate data for compliance with a set of contract-based conditions;

provide a performance rating to a vehicle repair shop associated with the vehicle repair estimating system, the performance rating based at least on the repair estimate;

transmit the performance rating to the vehicle repair estimating system; and based on the change and the analyzing of the first set and the second set of estimate data, transfer and communicate the changed and encrypted first set and the second set of estimate data to the insurance company server, and further wherein the vehicle insurance claim management application provides interoperability between the insurance company server and the vehicle repair estimating system.

9. The insurance claim system claim 8, wherein the vehicle insurance claim management application in communication with the insurance company server and the vehicle repair estimating system causes the insurance claim system further to: provide a timeline indicating a plurality of milestone dates corresponding to at least one of the first or second work request.

10. The insurance claim system of claim 8, wherein the vehicle insurance claim management application in communication with the insurance company server and the vehicle repair estimating system causes the insurance claim system further to: provide an interactive calendar through which the vehicle repair shop schedules a repair of a vehicle corresponding to at least one of the first or second work request.

11. The insurance claim system of claim 8, wherein the insurance company server is coupled to a web server through which users interact with the vehicle insurance claim management application and the insurance claim system.

12. The insurance claim system of claim 11, wherein the web server includes a claim processing system used to store the set of assignment data for further processing.

13. An insurance claim system for improved interoperability between an insurance company server and a vehicle repair estimating system, the system comprising:
 a work request that includes a set of assignment data with information about at least one of a customer, a corresponding vehicle, or a corresponding loss of a vehicle;
 the insurance company server comprising at least one first computer processor and a user interface and coupled to a network;
 the vehicle repair estimating system having at least one second computer processor and interconnected with the insurance company server via the network, the vehicle repair estimating system configured to create a repair estimate, wherein the repair estimate includes a set of estimate data of the corresponding loss of the vehicle;
 a vehicle insurance claim management application operating on the insurance company server and the vehicle repair estimating system and executing a specific sequence of steps with the insurance company server and the vehicle repair estimating system that causes the insurance claim system to:
  receive the work request and the set of assignment data from the insurance company server, wherein the set of assignment data includes information about at least one of the customer, the corresponding vehicle, and the corresponding loss of the vehicle;
  change the set of assignment data into a format accepted by the vehicle insurance claim management application, wherein the changing further includes encrypting the set of assignment data;
  transfer the changed and encrypted set of assignment data to the vehicle repair estimating system;
  receive the set of estimate data from the vehicle repair estimating system, wherein the set of estimate data includes information about the repair estimate for the corresponding loss of the vehicle, wherein the repair estimate is uploaded from the vehicle repair estimating system to the vehicle insurance claim management application;
  change the set of estimate data into the format accepted by the vehicle insurance claim management application, wherein the changing further includes encrypting the set of estimate data;
  analyze and audit the set of estimate data for compliance with a set of contract-based conditions;
  provide a performance rating to a vehicle repair shop associated with the vehicle repair estimating system, the performance rating based at least on the repair estimate;
  transmit the performance rating to the vehicle repair estimating system;
  based on the change and the analyzing of the set of estimate data, transfer and communicate the changed and encrypted set of estimate data to the insurance company server;
  receive a set of reinspection data from the insurance company server;
  review the set of reinspection data; and
  update and change the set of estimate data based on the set of reinspection data; and
 a web server coupled to and in communication with the insurance company server through which users interact with the vehicle insurance claim management application and the insurance claim system,
 and further wherein the vehicle insurance claim management application provides interoperability between the insurance company server and the vehicle repair estimating system.

14. The insurance claim system of claim 13, wherein the vehicle insurance claim management application in communication with the insurance company a server and the vehicle repair estimating system causes the insurance claim system further to:
 receive a second set of assignment data from the insurance company server via an assignment user interface, wherein the second set of assignment data includes information about at least one of a second customer, a corresponding second vehicle, or a corresponding second loss with the corresponding second vehicle;

change the second set of assignment data into the format accepted by the vehicle insurance claim management application, wherein the changing further includes encrypting the second set of assignment data;

transfer the changed and encrypted second set of assignment data to the vehicle repair estimating system;

receive a second set of estimate data of the corresponding second loss with the corresponding second vehicle from the vehicle repair estimating system, wherein the second set of estimate data includes information about a second repair estimate for the corresponding second loss of the corresponding second vehicle, wherein the second repair estimate is uploaded from the vehicle repair estimating system to the vehicle insurance claim management application; and change the second set of estimate data into the format accepted by the vehicle insurance claim management application, wherein the changing further includes encrypting the second set of estimate data.

15. The insurance claim system of claim 13, wherein the web server includes a claim processing system used to store the set of assignment data for further processing.

16. The insurance claim system of claim 13, wherein the vehicle insurance claim management application in communication with the insurance company server and the vehicle repair estimating system causes the insurance claim system further to: provide a timeline indicating a plurality of milestone dates corresponding to the work request.

17. The insurance claim system of claim 13, wherein the vehicle insurance claim management application in communication with the insurance company server and the vehicle repair estimating system causes the insurance claim system further to: provide an interactive calendar through which the vehicle repair shop schedules a repair of the vehicle corresponding to the work request.

18. The insurance claim system of claim 7, wherein the vehicle insurance claim management application in communication with the insurance company server and the vehicle repair estimating system causes the insurance claim system further to:

upon completion of the repair, provide an updated performance rating of the vehicle repair shop based at least on the accuracy of the repair estimate as compared to a final repair cost; and transmit the updated performance rating to the vehicle repair estimating system.

19. The insurance claim system of claim 10, wherein the vehicle insurance claim management application in communication with the insurance company server and the vehicle repair estimating system causes the insurance claim system further to:

upon completion of the repair, provide an updated performance rating of the vehicle repair shop based at least on the accuracy of the repair estimate as compared to a final repair cost; and transmit the updated performance rating to the vehicle repair estimating system.

20. The insurance claim system of claim 17, wherein the vehicle insurance claim management application in communication with the insurance company server and the vehicle repair estimating system causes the insurance claim system further to:

upon completion of the repair, provide an updated performance rating of the vehicle repair shop based at least on the accuracy of the repair estimate as compared to a final repair cost; and transmit the updated performance rating to the vehicle repair estimating system.

* * * * *